US010866978B2

(12) United States Patent
Raison et al.

(10) Patent No.: US 10,866,978 B2
(45) Date of Patent: Dec. 15, 2020

(54) TECHNIQUES TO RESPOND TO USER REQUESTS USING NATURAL-LANGUAGE MACHINE LEARNING BASED ON BRANCHING EXAMPLE CONVERSATIONS

(71) Applicant: Facebook, Inc., Menlo Park, CA (US)

(72) Inventors: Martin Jean Raison, San Francisco, CA (US); Willy Blandin, San Francisco, CA (US); Andreea-Loredana Crisan, San Francisco, CA (US); Stepan Parunashvili, San Francisco, CA (US); Kemal El Moujahid, Mountain View, CA (US); Laurent Nicolas Landowski, Emeral Hills, CA (US)

(73) Assignee: FACEBOOK, INC., Menlo Park, CA (US)

( * ) Notice: Subject to any disclaimer, the term of this patent is extended or adjusted under 35 U.S.C. 154(b) by 888 days.

(21) Appl. No.: 15/391,250

(22) Filed: Dec. 27, 2016

(65) Prior Publication Data
US 2017/0293834 A1   Oct. 12, 2017

Related U.S. Application Data

(60) Provisional application No. 62/320,869, filed on Apr. 11, 2016.

(51) Int. Cl.
*G06F 16/33* (2019.01)
*G06N 3/08* (2006.01)
(Continued)

(52) U.S. Cl.
CPC ...... *G06F 16/3344* (2019.01); *G06F 16/3329* (2019.01); *G06F 40/35* (2020.01);
(Continued)

(58) Field of Classification Search
CPC .. G06F 16/334; G06F 16/3329; G06F 17/279; G06F 17/28; G06F 16/3322;
(Continued)

(56) References Cited

U.S. PATENT DOCUMENTS

2010/0162257 A1*   6/2010   Hiltunen ............... G06F 9/50
                                                    718/104
2012/0095835 A1*   4/2012   Makar .................. G06Q 10/10
                                                    705/14.53
(Continued)

OTHER PUBLICATIONS

Levin, Esther, Roberto Pieraccini, and Wieland Eckert. "Using Markov decision process for learning dialogue strategies." Proceedings of the 1998 IEEE International Conference on Acoustics, Speech and Signal Processing, ICASSP'98 (Cat. No. 98CH36181). vol. 1. IEEE, 1998. (Year: 1998).*

*Primary Examiner* — Austin Hicks

(57) ABSTRACT

Techniques to response to respond to user requests using natural-language machine learning based on branching example conversations are described. In one embodiment, an apparatus may comprise a bot application interface component operative to receive an example-interaction repository, the example-interaction repository comprising a plurality of example user-to-bot interactions, including one or more branching example user-to-bot interactions; and an interaction processing component operative to generate a linearized example-interaction repository by replacing the one or more branching example user-to-bot interactions with the plurality of linearized example user-to-bot interactions; submit the example-interaction repository to a natural-language machine learning component; and receive a sequence model from the natural-language machine learning component in response to submitting the example-interaction repository; and a client communication component operative to perform a user-to-bot conversation based on the
(Continued)

sequence model. Other embodiments are described and claimed.

18 Claims, 12 Drawing Sheets

(51) Int. Cl.
| | |
|---|---|
| *G06N 20/00* | (2019.01) |
| *G06F 16/332* | (2019.01) |
| *G06N 5/04* | (2006.01) |
| *G06F 40/35* | (2020.01) |
| *G06F 40/40* | (2020.01) |
| *H04L 12/58* | (2006.01) |
| *G06N 3/00* | (2006.01) |

(52) U.S. Cl.
CPC ............... *G06F 40/40* (2020.01); *G06N 3/08* (2013.01); *G06N 5/041* (2013.01); *G06N 20/00* (2019.01); *H04L 51/02* (2013.01); *G06F 16/3322* (2019.01); *G06N 3/006* (2013.01)

(58) Field of Classification Search
CPC ...... G06F 16/3344; G06F 40/35; G06F 40/40; G06N 20/00; G06N 20/10; G06N 20/20; G06N 5/041; G06N 3/006; G06N 3/08; H04L 51/02
See application file for complete search history.

(56) References Cited

U.S. PATENT DOCUMENTS

| | | | | |
|---|---|---|---|---|
| 2015/0347919 | A1* | 12/2015 | Bastide | G06F 16/9535 706/52 |
| 2016/0011957 | A1* | 1/2016 | Bates | G06F 11/3636 714/38.1 |

\* cited by examiner

600

> Receive an example-interaction repository, the example-interaction repository comprising a plurality of example user-to-bot interactions, the plurality of example user-to-bot interactions comprising one or more branching example user-to-bot interactions.
> *602*

> Generate a plurality of linearized example user-to-bot interactions, wherein each of the one or more branching example user-to-bot interactions is traversed multiple times to produce multiple linearized example user-to-bot interactions of the plurality of linearized example user-to-bot interactions.
> *604*

> Generate a linearized example-interaction repository by replacing the one or more branching example user-to-bot interactions with the plurality of linearized example user-to-bot interactions.
> *606*

> Submit the linearized example-interaction repository to a natural-language machine learning component.
> *608*

> Receive a sequence model from the natural-language machine learning component in response to submitting the linearized example-interaction repository.
> *610*

> Perform a user-to-bot conversation based on the sequence model.
> *612*

*FIG. 6*

TECHNIQUES TO RESPOND TO USER REQUESTS USING NATURAL-LANGUAGE MACHINE LEARNING BASED ON BRANCHING EXAMPLE CONVERSATIONS

RELATED APPLICATIONS

This application claims the benefit of priority under 35 U.S.C. § 119(e) to U.S. Provisional Patent Application No. 62/320,869, titled "Techniques to Respond to User Requests Using Natural-Language Machine Learning Based on Example Conversations," filed on Apr. 11, 2016, which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging applications, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to respond to user requests using natural-language machine learning based on branching example conversations. Some embodiments are particularly directed to techniques to response to user requests using natural-language machine learning based on branching example conversations for the fulfillment of user service requests, in which branching example conversations are repeatedly traversed to generate linearized example conversations. In one embodiment, for example, an apparatus may comprise a bot application interface component operative to receive an example-interaction repository, the example-interaction repository comprising a plurality of example user-to-bot interactions, including one or more branching example user-to-bot interactions; and an interaction processing component operative to generate a linearized example-interaction repository by replacing the one or more branching example user-to-bot interactions with the plurality of linearized example user-to-bot interactions; submit the example-interaction repository to a natural-language machine learning component; and receive a sequence model from the natural-language machine learning component in response to submitting the example-interaction repository; and a client communication component operative to perform a user-to-bot conversation based on the sequence model. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6 illustrates an embodiment of a logic flow for the system of FIG. 1.

DETAILED DESCRIPTION

Figure 1:
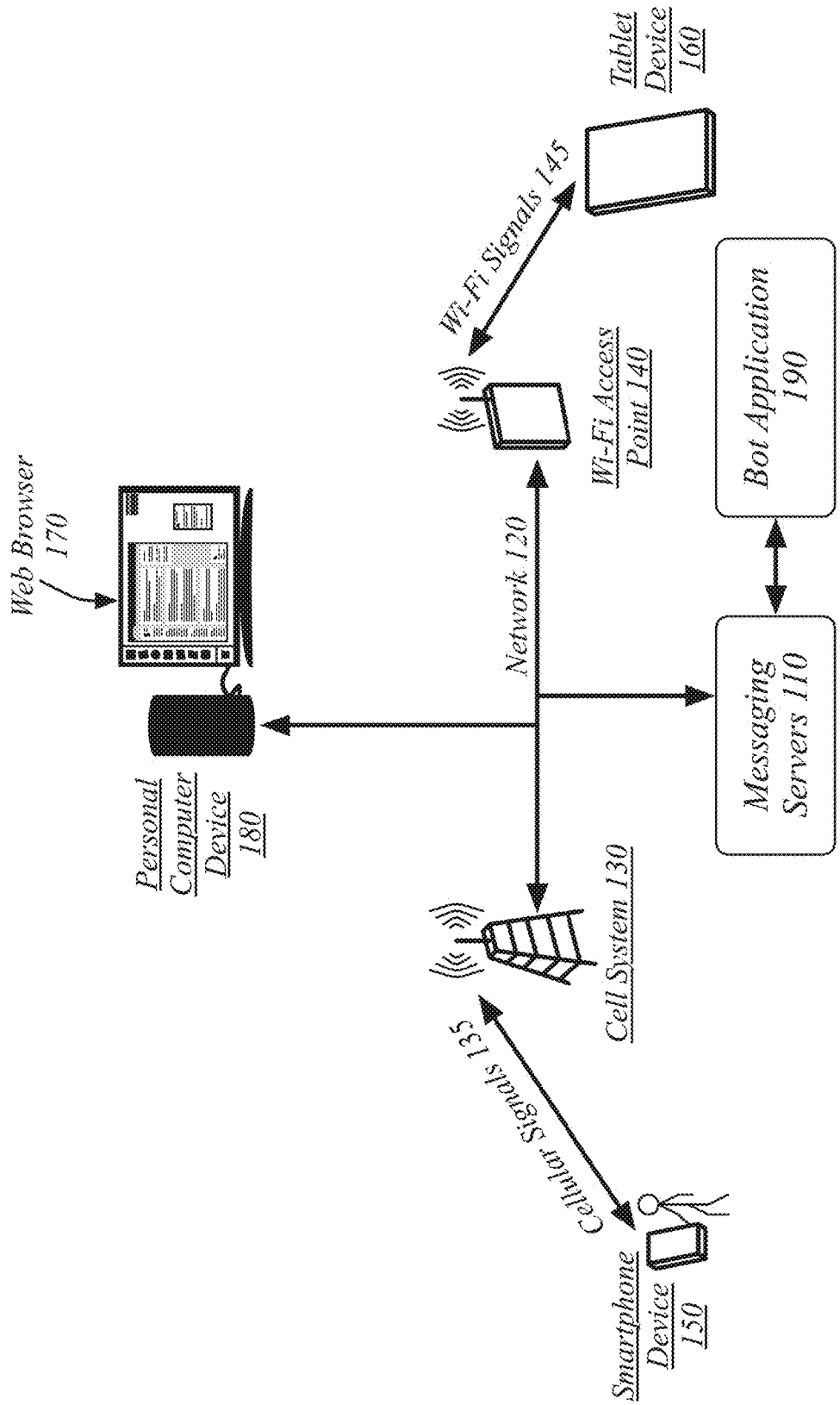
FIG. 1 illustrates an embodiment of a user request communication system.

Network-connected computing devices can provide their users with an unprecedented ability to engage in interpersonal communication. People may engage in messaging interactions with their friends, family, coworkers, and other associates. A user's message exchanges with their contacts may each be maintained within a distinct message thread.

These network-connected computing devices can also provide their users with access to network-accessible services. For instance, transportation services, dining services, entertainment services, and other services may use web sites, web applications, client applications, or other network-accessibility techniques to empower people to use their client devices to engage with their services. In some cases, such as some entertainment or media services, the service can be both arranged and delivered via the client devices. For example, music may be purchased via a client device and delivered to the client device for playback. In other cases, such as with transportation, dining, and in-person entertainment, the service can be arranged via the client devices, but is performed external to the client device. For example, a ride-sharing service may be arranged via a client device but performed through a vehicle and driver providing ride sharing to the user.

In some cases, the use of a network-accessible service may relate to more than one person. Particularly where a user's access to the service is a client device that they also use for messaging, a user may benefit from sharing their engagement with the network-accessible service in the messaging client with the others to whom the service relates. As such, message threads may act as hubs for a user's online social relationship with their contacts, with the message threads incorporating services requested, monitored, or engaged with via the same client used for messaging.

To aid a user in interacting with a service via a messaging context, services may be represented as messaging bots within a messaging system. A messaging bot may be an automated front-end to a network-accessible service that can be represented as a participant within a message thread. In some cases, a messaging bot may be corresponded with in a message thread that explicitly includes the messaging bot, such as a one-on-one message thread between a particular user and the messaging bot. In other cases, a messaging bot may be corresponded with in a message thread in which the messaging bot is not a regular participant, the messaging bot a temporary participant in the message thread for the purposes of interacting with the service. The messaging bot may be included as a temporary participant in any other thread, whether a one-on-one thread between two users or a group thread between multiple users.

As such, a user may engage with network services within the familiar experience of a messaging client. Further, by using a messaging client, a user may engage with network services within a messaging context so as to allow the inclusion of other people. In some cases, this may simply inform the other people as to the services, such as letting friends or family know about transportation details. In other cases, this may empower the performance of services for multiple people, such as where dinner, a ride, entertainment, or other service is arranged for the use of multiple people. As a result, the embodiments can improve the experience of using network-accessible services and can extend the reach of network-accessible services to the user of a messaging system.

The developing of a messaging bot may be constrained by the difficulties in generating natural language processing (NLP) systems. As such, the messaging system may provide a NLP system to perform the analysis of messaging conversations and to provide NLP information relevant to the performance of a service by a messaging bot to a bot application implementing the messaging bot.

One possible approach to generating an automated bot is through the specification of rules. Imperative instructions may be provided by a developer for how an automated bot should respond to various situations. Development with rules can initially be simple: an automated bot with two rules may have very limited capability, but within its limited scope, that capability may function. However, to accommodate new situations, new functionality, or other new elements the rules are supplemented with additional rules. The chain of pre-coded reasoning becomes longer, more complicated, and therefore becomes more difficult to maintain as consistent without conflict between the rules.

Machine learning may therefore be desirable as compared to rules-based bots. However, machine learning based on a training dataset places a burden on a developer to generate or gather the training dataset. This may be possible for a larger developer with significant resources to dedicate to a single project, but impractical for a smaller developer or even for a larger developer trying to introduce a variety of services within a reasonable budget and timeframe.

A bot platform may, therefore, benefit from providing a machine learning framework that empowers developers to create machine-learning based bots using an amount of time and resources sufficiently modest as to engender a rich community of bots. A bot platform that enables developers to efficiently develop bots that can be improved over time using machine learning encourages the creation of bots and therefore the providing of services to consumers of the bot platform.

A developer may be aided by being provided a natural way to specify the structure of how a messaging bot should gather information relevant to the performance of its service. The bot platform may provide a bot engine that empower developers to define the behavior of their bots using stories. Stories are example conversations. On top of user messages and bot messages, the stories may also contain bot actions that carry out the service provided by a bot. The stories may also be annotated with examples of the information that a bot should be extracting from user messages, thereby teaching the bots what to learn and how.

A developer may be empowered to configure an information-gathering process by providing annotated example conversations between a hypothetical user and the messaging bot that illustrate how the information gathering process could work. The developer may write a plurality of example conversations, where each conversation represents a scenario for the messaging bot. These example conversations may be annotated to illustrate, for each message received from a user, what information the messaging bot should extract to build the context for a requested service. The example conversations may build to an application program interface (API) call to a bot application, where the API call uses the context built through the example conversation.

In some cases, these stories may be enhanced by using branches. A branch may be performed on a received user message, changing which portion of an example conversation should be performed depending on the contents of the user message. This may ease the development of stories by preventing the duplication of effort where two stories would have some portion be the same, such as an initial portion, while having other portions be different depending on how the user responds. In some cases, a branch may jump an example conversation to a bookmark in a conversation. This may be used, without limitation, to repeat a portion of a story multiple times. For instance, if multiple pieces of information are required in order to fulfill a request, an information-gathering portion of an example messaging conversation may be repeated in order to continue gathering information from the user until all of the information has been gathered.

Some bot messages may include quick replies. A quick reply is a possible reply to a bot message included with the bot message that is sent to a user. The quick replies are displayed in association with a response area of a user interface, such as where a user enters text into the user interface. The quick replies empowers a user to quickly and easily respond to a bot message using responses that are likely to be comprehensible and relevant to the bot.

When creating a bot, a developer may start with a few stories that describe the most likely conversations paths. At that stage, the bot engine can build a machine learning model that deliberately over-fits the stories dataset. The developer may thereby create a functional messaging bot through the specification of a few example conversations. However, due to the limited examples, the messaging bot based on these example conversations may adapt poorly to circumstances outside those considered and illustrated by the developer. Practically, it means that the stories behave almost like rules, with no flexibility or only limited flexibility in response to situations not anticipated by the stories. This may correspond, to some degree, to the difficulty faced by NLP systems that are rules based: they have a tendency to fail when real-world users act outside the assumptions for user behavior implicit in the structure of the rules.

This enables the developer to start testing the bot after generating only a few stories. This testing, either privately or in a live environment, results in the creation of conversations. The developer may turn test or real conversations into additional stories, these additional stories added to the existing stories for the bot, fed into the bot engine to produce an updated and improved machine learning model. Unlike with rules, the bot engine can resolve situations in which stories conflict with each other. As examples, not commandments, as new use cases are discovered, additional stories can be added without the need for the developer to take into account all the previous stories, with the bot engine able to ignore inconsistent stories. As such, this approach can provide the fast and efficient initial development of rules-based development with the flexibility and greater ability to successfully manage complexity of machine learning as the story dataset grows. A simple system may be scaled to a complex system, with the addition of each story being itself a simple action for the developer, due to the developer not needing to handle the resolution if any contradictions or needing to specify how one story relates to another. As such, scaling to complexity may be a simple and therefore manageable process for the developer.

As such, the initial drawback of the rules-based approach may be remedied by expanding the repository of example interactions to include not just the initial examples crafted by the developer but also additional examples generated from real-world interactions by the messaging bot in a live production environment or pre-launch live testing environment. The messaging system may log conversations with users and present these conversations for editing and validating by a developer or other administrator. Live examples that resulted in successful action by the messaging bot may be annotated and used as examples for the messaging bot in the future. Live examples that resulted in failure may be edited to show how the messaging bot should have behaved, then annotated and used as examples for the messaging bot. In either success or failure, new examples may be generated, expanding the examples available to a NLP system for learning how to process natural language for the messaging bot. This may serve to transition the behavior of the messaging bot from being subjected to the same rigidity-based failure as a rules-based system to the adaptability of a more abstract system.

As this transition may be implemented based on actually-occurring issues, the most prominent and heavily-experienced issues may be addressed most quickly, focusing developer attention on the most important areas for improvement. Similarly, as this transition happens in response to real users actually using the bot, the bot may be refined and expanded towards the expectations that users are actually bringing to the service. Further, as this transition occurs over the lifetime of a messaging bot, a developer may launch a service and be engaged in the market with a functional product, thereby granting them revenue in order to improve their service over time. As a result, a learning NLP system provided by a messaging system may improve the practicality of providing an NLP-based service for a developer.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a user request communication system 100. In one embodiment, the user request communication system 100 may comprise a computer-implemented system having software applications comprising one or more components. Although the user request communication system 100 shown in FIG. 1 has a limited number of elements in a certain topology, it may be appreciated that the user request communication system 100 may include more or less elements in alternate topologies as desired for a given implementation.

A bot application, possibly of a plurality of bot applications, may operate within a network environment including a messaging system empowering the exchange of messages and other information. The bot application 190 may comprise a software application executing on a computer system. The bot application 190 may use a messaging system to exchange messages comprising user messages and bot messages. User messages may comprise user requests and messages clarifying and specifying user requests. Bot messages may clarify requests for information relating to user requests and performance information relating to user requests. In some cases, the messaging system may comprise a general messaging system also used for other messages. In other cases, the messaging system may comprise a messaging system exclusive to communicating with bot applications.

The messaging servers 110 may comprise one or more messaging servers operated by a messaging system as part of the user request communication system 100. A messaging server may comprise an Internet-accessible server, with the network 120 connecting the various devices of the user request communication system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging servers 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging servers 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging servers 110.

A messaging client may be a dedicated messaging client. A dedicated messaging client may be specifically associated with a messaging provider administering the messaging system including the messaging servers 110. A dedicated messaging client may be a general client operative to work with a plurality of different messaging providers including the messaging provider administering the messaging system including the messaging servers 110. A messaging client may empower access to bot applications for the performance of services, such as where the bot applications are one of a plurality of endpoints and/or services accessible via the messaging servers 110.

The messaging client may be a component of an application providing additional functionality. For example, a social networking service may provide a social networking application for use on a mobile device for accessing and using the social networking service. The social networking service may include messaging functionality such as may be provided by messaging servers 110. It will be appreciated that the messaging servers 110 may be one component of a computing device for a social networking service, with the computing device providing additional functionality of the social networking service. Similarly, a social networking application may provide both messaging functionality and additional functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. Messaging applications on different devices may comprise installations of the same application on both devices. Messaging applications on different devices may comprise smartphone-specific and tablet-specific versions of a common application. Messaging applications on different devices may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging servers 110 due to it not maintaining or otherwise not having access to an existing state for the message inbox. The web browser 170 may then retrieve incremental updates for any new changes to the state of the message inbox so long as it maintains a user session with the messaging servers 110, discarding its known state for the message inbox at the end of the session, such as when the web browser 170 is closed by the user. Without limitation, an update may correspond to the addition of a message to a inbox, a deletion of a message from a inbox, and a read receipt.

A user request communication system 100 may operate by defining a messaging inbox as comprising a plurality of messages, wherein each message is an individual transaction of communication between two or more participants. A messaging server may operate by maintaining a message index for the messaging inbox. Messaging servers may receive messages and store the messages in message archives from which messages may be retrieved through reference to the message index. Messaging clients may connect to the messaging servers and retrieve messages that have been added to their message archive since their last update. The messaging clients may receive a message index from the message archive indicating what messages are stored in the message archive. The messaging clients may compare the message archive to their current inbox in order to determine what messages they are missing, which they then request from the message archive. The messaging clients may make changes to their inbox, which results in message inbox instructions being transmitted to the message archives instructing the message archives in modifications to make to the representation of their message inbox on the message archives.

Messaging interactions mediated by a messaging system may be organized into shared spaces known as message threads. A message thread may collect together the messages shared between a particular group of users. Messages sent individually between a pair of users may be collected into a one-on-one message thread uniquely associated with the private messaging between the pair of users. Messages sent between a group of three or more users may not be uniquely defined by their membership, but instead by, in some embodiments, an identifier uniquely identifying the group thread. Membership in a group thread may, in some embodiments, vary over time, adding and/or losing members. A message thread may be between, for instance, a user and a messaging bot, wherein the user accesses the message thread to engage in messaging with the messaging bot in order to submit requests and engage in a dialog regarding requests.

The user request communication system 100 may use knowledge generated from interactions in between users. The user request communication system 100 may comprise a component of a social-networking system and may use knowledge generated from the broader interactions of the social-networking system. As such, to protect the privacy of the users of the user request communication system 100 and the larger social-networking system, user request communication system 100 may include an authorization server (or other suitable component(s)) that allows users to opt in to or opt out of having their actions logged by the user request communication system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the user request communication system 100 and other elements of a social-networking system through blocking, data hashing, anonymization, or other suitable techniques as appropriate.

Figure 2A:
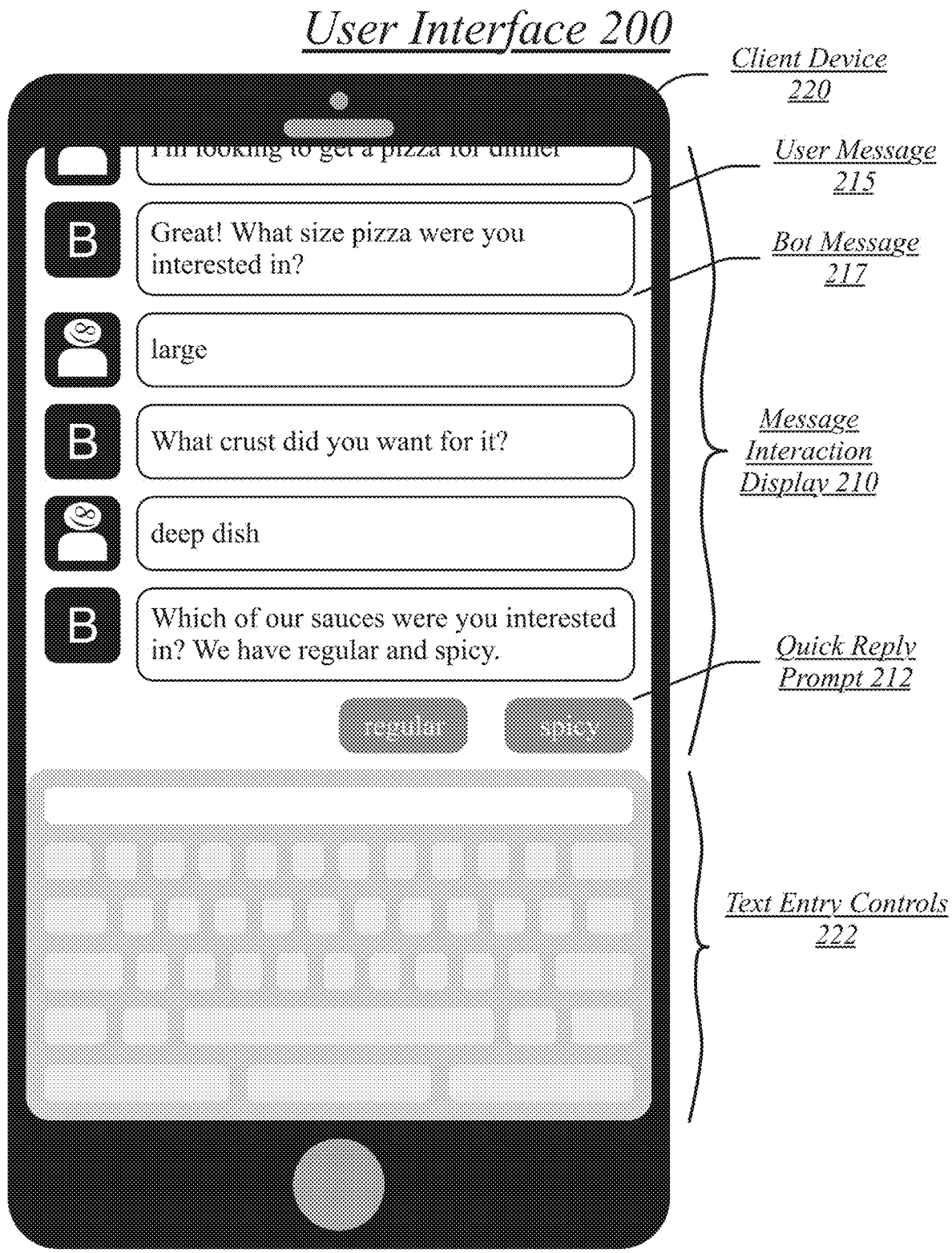
FIG. 2A illustrates an embodiment of a user interface for a user client.

FIG. 2A illustrates an embodiment of a user interface 200 for a user client.

A user interface 200 may be displayed on a client device 220. The client device 220 may correspond to, without limitation, a smartphone device 150, a personal computer device 180, a tablet device 160, or any other form of client device. The user interface 200 may be displayed via a web browser, such as may execute on a smartphone device 150, tablet device 160, personal computer device 180, or other device. The user interface 200 may be displayed in a messaging application, such as may execute on a smartphone device 150, tablet device 160, personal computer device 180, or other device. The user interface 200 may be displayed in an automated bot service application, such as may execute on a smartphone device 150, tablet device 160, personal computer device 180, or other device. The user interface 200 may be displayed using a variety of techniques, without limitation to the examples listed here.

A user interface 200 may include a message interaction display 210. A message interaction display 210 may comprise a series of messages exchanged between a user of the client device 220 and an automated bot implemented by a bot application 190. A message interaction display 210 may include a user message 215 of a plurality of user messages. User messages may be displayed in association with an avatar for the user. A message interaction display 210 may include a bot message 217 of a plurality of bot messages. Bot messages may be displayed in association with an avatar for the bot as corresponds to the bot application 190. The message interaction display 210 may, in some cases, only visibly include a portion of the user messages and bot messages, such as due to limited screen space of the client device 220.

A client device 220 may include controls for operating the user interface 200. The controls may include text entry controls 222 empowering the entering of text for the composition of text-based messages. The controls may include hardware controls. In some embodiments, controls may be touchscreen-based controls.

A user interface 200 may include a plurality of quick reply prompts 212. The quick reply prompts 212 are provided as part of the message package for a bot message, the quick reply prompts 212 providing convenient quick responses to a bot message for the user of the client device 220. The user may select a quick reply prompt of the plurality of provided quick reply prompts 212. The selection of a quick reply prompt by the user initiates the sending of the quick reply prompt to the messaging bot via the messaging system. This may provide multiple benefits to the user. It may ease the process of responding to a message by providing appropriate responses that can be selected with a single user interface action, such as pressing them on a touch screen. When conversing with a messaging bot, the use of quick reply prompts 212 may also prime the user with responses that the messaging bot is capable and well-configured to respond to. However, a user may still enter a user-generated response, such as by using the text entry controls 222.

Figure 2B:
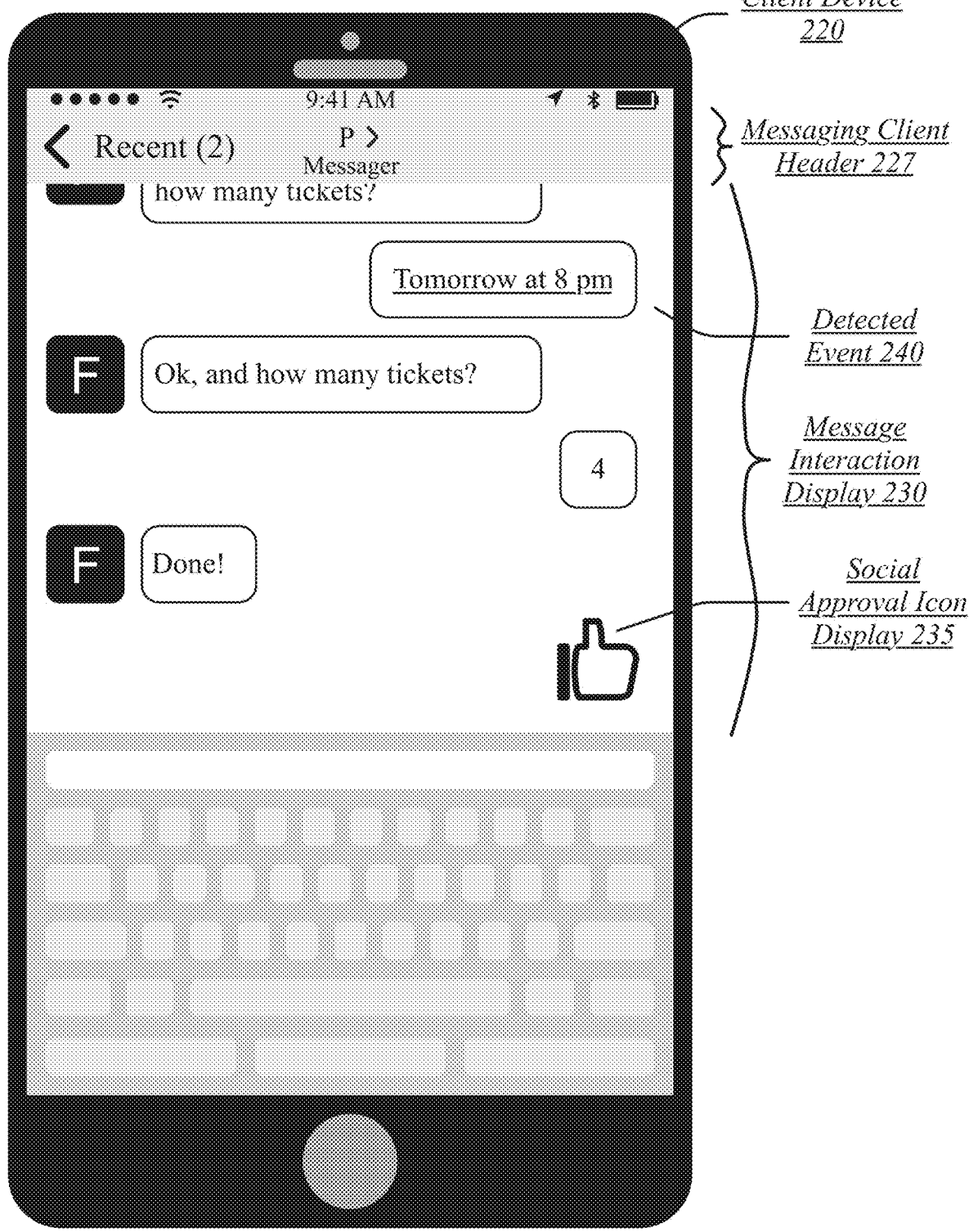
FIG. 2B illustrates an embodiment of a user interface for a user client.

FIG. 2B illustrates an embodiment of a user interface 225 for a user client.

A messaging client may display a messaging client header 227. The messaging client header 227 may comprise a title for a message thread, such as the name of a messaging bot with which the user may engage via the message thread. The messaging client header 227 may comprise a control to return a user to an inbox view for the messaging client. An inbox view control may be augmented with a number of recent message threads with unread messages.

A user interface 225 may include a message interaction display 230. A message interaction display 230 may comprise a series of messages exchanged between a user of the client device 220 and an automated bot implemented by a bot application 190. A message interaction display 230 may include a plurality of user messages. User messages may be displayed without an avatar for the user of the client device 220, due to the user not needing themselves to be identified to themselves. A message interaction display 230 may include a plurality of bot messages. Bot messages may be displayed in association with an avatar for the bot as corresponds to the bot application 190. The message interaction display 230 may, in some cases, only visibly include a portion of the user messages and bot messages, such as due to limited screen space of the client device 220. A message interaction display 230 may include a social approval icon display 235 displaying a social approval icon, such as a thumbs-up. The sending and receiving of a social approval icon display 235 may comprise a specific case of sending and receiving a message using the messaging system, with the social approval icon display 235 being an element embedded within a message. A message interaction display 230 may include a detected event 240, such as may be marked with underlining, to indicate an actionable portion of text. Selecting a detected event 240 may instantiate an interface for adding the detected event 240 to a calendar for the user.

Figure 3:
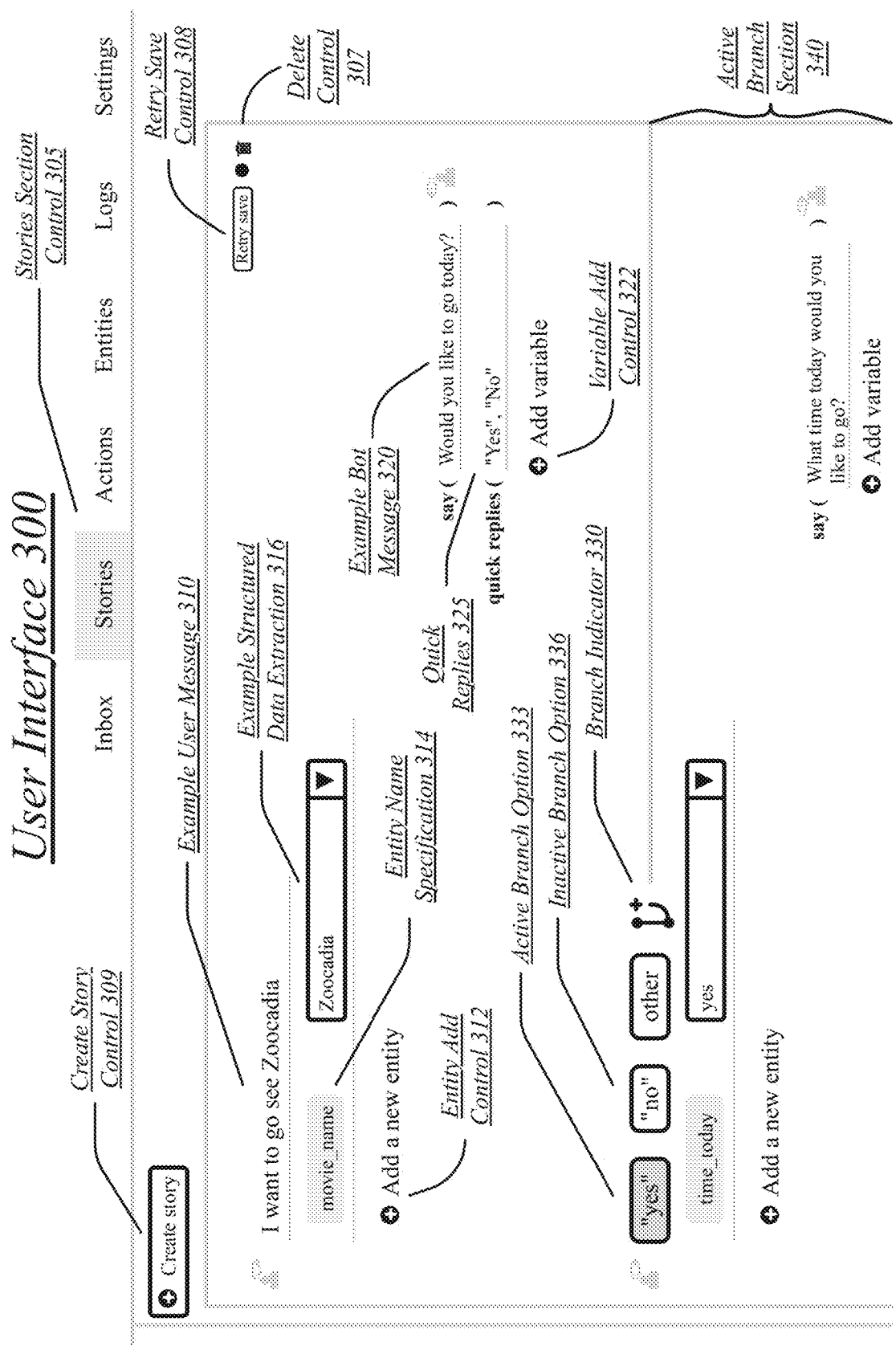
FIG. 3 illustrates an embodiment of a user interface for a developer console.

FIG. 3 illustrates an embodiment of a user interface 300 for a developer console. In some embodiments, a developer console may be displayed in a web browser accessing a web site for the user request communication system 100, with the developer console hosted by the user request communication system 100. The illustrated user interface 300 may comprise only a portion of an example conversation, such as may be displayed in a scrollable interface.

A developer console may be used by a developer of a messaging bot to configure the messaging bot for the performance of one or more services for a user. A developer console may be used to compose and annotate developer-written example conversations. A developer console may also be used to edit and annotate production-use-derived example conversations. The user interface 300 may correspond to either of these cases.

The developer console may display and empower the creation of a messaging conversation with annotations. An example messaging conversation may be a story illustrating the planned behavior of a messaging bot. The story can also include actual conversations, not just planned. For example, as a messaging bot is put into use, the system collects the actual conversations, which may then be put into use as training stories. An example messaging conversation may include an example user message 310, the example user message 310 generated either from a live user-to-bot messaging conversation or written by a developer of the messaging bot. An example messaging conversation may include an example bot message 320, the example bot message 320 placed in the conversation based on either a live user-to-bot messaging conversation or placed by a developer of the messaging bot. It will be appreciated that as the bot messages may be derived from examples written by developers, that an example bot message 320 placed in the conversation based on a live user-to-bot messaging conversation may still have been originally drafted by a bot developer.

A developer console may include a plurality of sections, including a story section. A story section may be selected by selecting a stories selection control 305. The stories section may be used for configuring stories for use in teaching a natural language machine learning component the desired behavior for a messaging bot. The developer console may include additional sections, such as an inbox section (for receiving messages related to a messaging bot), an actions section (for configuring bot actions for performance by the messaging bot), an entities section (for configuring a structured data object for use in storing the user-context for a messaging interaction), a log section (for viewing logs of a messaging bot's messaging interactions, such as may be used to generate additional stories), and a settings section (for configuring settings for a messaging bot). Other or alternative sections may be used.

The story section may, in some cases, be reached via the log section. The log section may display logs of some or all of the conversations a messaging bot has engaged in. The developer may review these conversations to determine additional functionality desired for the messaging bot, additional requests the messaging bot should be able to handle, additional statements the messaging bot should be able to understand, and generally additional training appropriate for the messaging bot. In some cases, a developer may choose to transition to the story section and compose a story to provide the additional training. In some cases, a developer may choose to copy a logged conversation to the story section and edit and annotate the logged conversation to generate a story.

A developer console may include a create story control 309. A create story control 309 may empower the creation of an additional story for use in configuring a messaging bot.

A developer console may include a retry save control 308. A retry save control 308 may be used to initiate a save operation and/or to retry a save operation.

A developer console may include a delete control 307. The delete control 307 may empower the deletion of the current story being edited in the developer console.

A developer console may include an example user message 310. The example user message 310 may comprise a text segment composed by a developer via the developer console to illustrate an expected or possible user message for interaction with the messaging bot.

A developer console may comprise an entity name specification 314. An entity name specification 314 may specify the name of an entity configured in a structured data object. This specification of this entity identifies the entity as appearing in the example user message 310.

Some entities may be specified via a predefined entity specification. A predefined entity specification may correspond to a predefined type of entity with the user request communication system 100. Predefined entity types may include, without limitation, a place name type, an address type, a person name type, a phone number type, an email address type, or any other type predefined with the user request communication system 100 based on their common appearance in messaging interactions.

A developer console may be annotated with an example structured data extraction 316. A messaging bot may have a structured data object defined by the developer for the storage of a user-request context. A user-request context may encapsulate context information in a plurality of data fields. A structured data extraction may provide a value to one or more of the plurality of data fields. The example structured data extraction 316 may specify the portion of the example user message 310 associated with the entity name specification 314 that the messaging bot should be trained to extract from similar example. The example structured data extraction 316 may be specified via a drop-down menu, wherein the drop-down menu comprises each of the text segments in the example user message 310.

A developer console may comprise an example bot message 320. The example user message 320 may comprise a text segment composed by a developer via the developer console to illustrate an expected or possible bot message for interaction with a user.

An example bot message 320 may be augmented with one or more quick replies 325. The quick replies 325 may be entered by the developer into the developer console and assigned to the example bot message 320 for inclusion when the example bot message 320 is sent to a user. The quick replies 325 are then displayed to the user in conjunction with the example bot message 320.

A developer console may comprise a variable add control 322. A variable add control 324 may empower the adding of a variable element to an example bot message 320, such that the value of the variable element is included in the example bot message 320 when sent to a user.

The example messaging conversation may include a branch. The developer console may include an add branch control, to add a branch where the example messaging conversation diverges based on a user message. A branch may be marked by a branch indicator 330 in the developer console. Each of the example user messages upon which a branching example messaging conversation may diverge is a branch option.

Each of the branch options for a particular branch is displayed in the developer console. A particular branch option may be selected to make an active branch option 333. A branch section for the active branch option 333 is displayed in the developer console as an active branch section 340. The branch section for a branch option is the path in the example messaging conversation that will be taken if the branch option is received from a user as a user message. As such, where there are multiple branch options, multiple branch sections are defined for the example messaging conversation moving forward from the branch. Only the active branch section 340 is displayed for reviewing and editing at any one time, with the developer empowered to select an inactive branch option 336 to make the inactive branch option 336 active, to display that branch options branch section, and thereby make it available for review and editing.

As illustrated, the branch options 333, 336 for an example user message following an example bot message 320 with quick replies 325 may correspond to the quick replies 325 for that example bot message 320. In some embodiments, the quick replies 325 may be automatically configured as branch options for the example user message responding to an example bot message 320. In some embodiments, a quick-reply to branch-option control may be provided empowering the automatic configuration of the quick replies 325 as branch options. In some cases, an other-response branch option may be included in the branch options to catch cases in which none of the specific branch responses—"yes" and "no" in the illustrated embodiment—match a received user message.

A messaging interaction between a user and a bot may build towards the performance of a service by the messaging bot for the user, though that action may not represent the end of the conversation between the user and the bot. An example bot action may be specified in a developer console. An example bot action may be defined in terms of a bot API call to a bot application 190 provided by a developer. The bot API call may take a user-request context and user-request entities as inputs. The user-request context may comprise a structured data object comprising the values extracted by an NLP system. The user-request entities may comprise the output of a semantic analysis of user inputs by the NLP system. The user-request entities may comprise the output of a semantic analysis of a most-recent user message, for all user messages in a conversation, or some other set of user messages, without limitation.

A bot API call may be implemented in the bot application 190 by the developer, with the NLP system determining the specific bot API call to make of a plurality that may be specified for a messaging bot. The bot API call may return one or more values, which update a user-request context.

Figure 4:
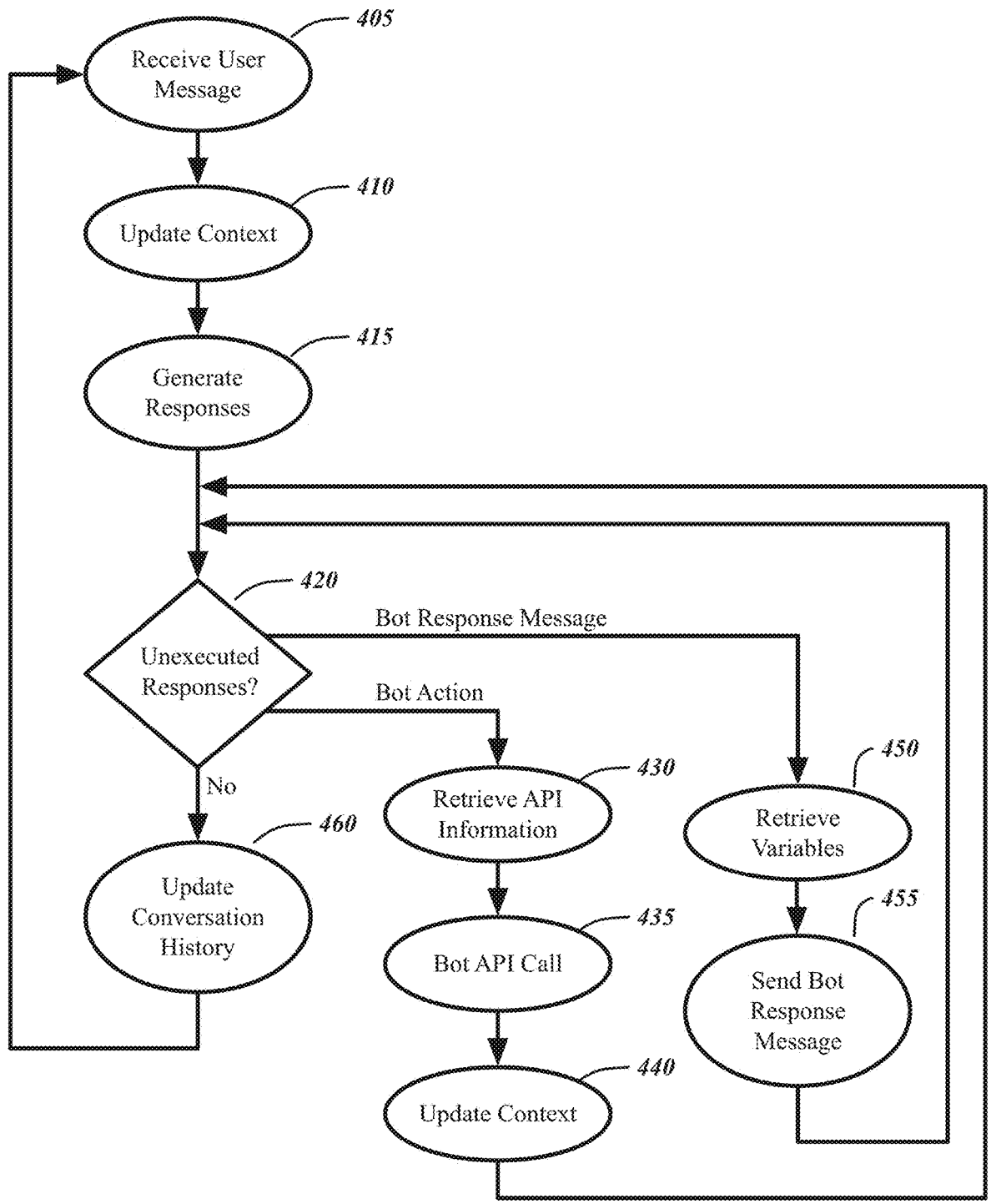
FIG. 4 illustrates an embodiment of a branching logic flow for the system of FIG. 1.

FIG. 4 illustrates an embodiment of a branching logic flow 400 for the user request communication system 100 of FIG. 1. The branching logic flow 400 may be representative of some or all of the operations executed by one or more embodiments described herein.

In the illustrated embodiment shown in FIG. 4, the logic flow 400 may receive a user message at block 405. This logic flow 400 may generally begin with the reception of a user message, and therefore the processes of logic flow 400. The logic flow 400 may then proceed to block 410.

The logic flow 400 may update the user-request context at block 410. Updating the user-request context may comprise extracting one or more values from the received user message and storing the one or more values in a structured data object. The logic flow 400 may then proceed to block 415.

The logic flow 400 may generate one or more bot responses to the received user message at block 415. Generating the one or more bot responses may comprise generating a plurality of bot response options and selecting a particular one or more for use in responding to the user message. The logic flow 400 may then proceed to block 420.

The logic flow 400 may branch at block 420 based on whether unexecuted bot responses are available. It will be appreciated that bot responses may be ordered, and as such a next available bot response may be present. If the next available bot response is a bot action, the logic flow 400 may proceed to block 430. If the next available bot response is a bot response message, the logic flow 400 may proceed to block 450. If no more bot responses are available, the logic flow 400 may proceed to block 460.

The logic flow 400 may retrieve API information at block 430. A bot action may be carried out by performing an API call to a bot application 190 with one or more inputs. The information for the inputs to the API call may be retrieved and made available. The logic flow 400 may then proceed to block 435.

The logic flow 400 may perform the bot API call at block 435. Performing the bot API call may comprise engaging in an API call to a bot application 190. Some bot applications may be locally-executed by a computer system executing the logic flow 400, and as such the API call may be a local API call. Some bot application may be remotely-executed by a different computer system than that executing the logic flow 400, and as such the API call may be a remote API call using a network access to a bot application 190. The logic flow 400 may then proceed to block 440.

The logic flow 400 may update the user-request context based on the bot API call at block 440. In some cases, a bot API call may return values for the user-request context. In some embodiments, return values may be provided as return values to the bot API call. In other cases, the structured data object embodying the user-request context may be modified by the bot application 190 and returned as the modified structured data object, with the returned modified structured data object replacing the previous structured data object used by the NLP system. The logic flow 400 may then proceed to loop back to block 420.

The logic flow 400 may retrieve variables for a bot response message at block 450. In some cases, a bot response message may be a static message, with all elements of the bot response message statically specified. In other cases, a bot response message may comprise one or more variable entries to be filled in with specific value at the time of execution. The logic flow 400 may retrieve these values to specify the variables based on the user request-context. The logic flow 400 may then proceed to block 455.

The logic flow 400 may send a bot response message at block 455. Sending the bot response message may comprise sending a message via a messaging system to a client device for a user. The bot response message may have one or more variables set to retrieved values prior to sending. The logic flow 400 may then proceed to loop back to block 420.

The logic flow 400 may update a conversation history at block 460. The conversation history may be updated to include the received user message and any performed bot actions and sent bot messages. It will be appreciated that in some embodiments the conversation history may be immediately updated after the reception of any user message, after the performance of any bot action, and after the send of any bot messages. The logic flow 400 may then proceed to loop back to block 405.

The logic flow 400 may continue until the end of a conversation. In some cases, a conversation may be completed after the successful performance of a user request, including the providing of information regarding the performance to the user and the reception of any user feedback. In some cases, a conversation may be completed after the failure to fulfill a user request. In some cases, a conversation may be completed after a user stop submitting user messages. In some cases, a conversation may be ended, and the user-request context and the conversation history cleared, and the logic flow 400 still available to receive user messages in a subsequent conversation.

Figure 5:
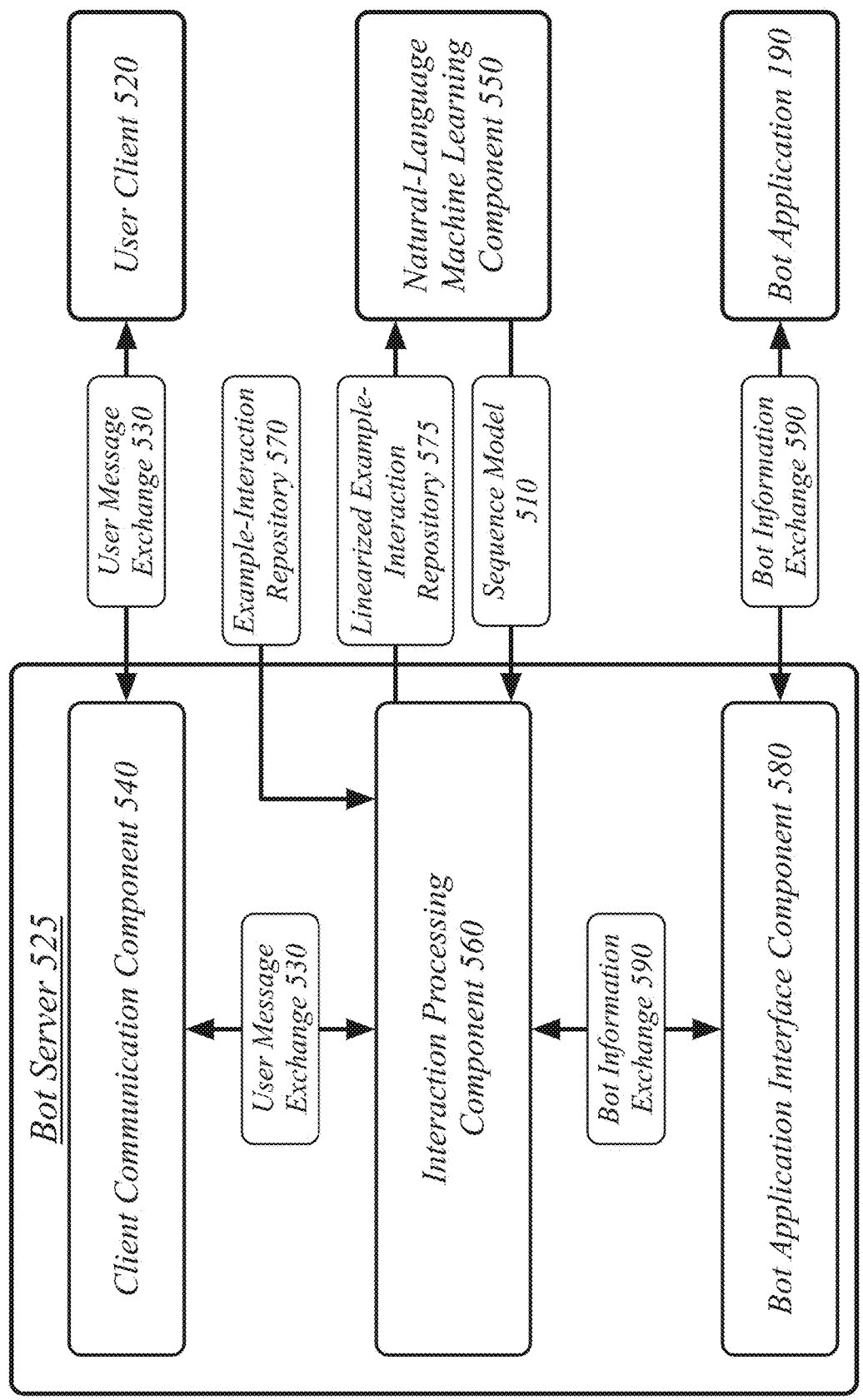
FIG. 5 illustrates an embodiment of a user-to-bot conversation being performed by a user request communication system.

FIG. 5 illustrates an embodiment of a user-to-bot conversation being performed by a user request communication system 100.

The user-to-bot conversation may be mediated by a bot server 525. The bot server 525 may be coupled to messaging servers 110 for a messaging system. The messaging servers 110 may perform the sending and receiving of messages between the bot server 525 and the user client 520. The messaging servers 110 may perform the sending and receiving of information between the bot server 525 and the bot application 190, or a bot application front-end may be used.

A user client 520 may comprise a messaging client, a dedicated client for access to the bot application 190 or a plurality of bot applications 190, or any other client including messaging functionality. The user client 520 may execute on the client device. The user client 520 may engage in a user message exchange 530 with the bot server 525 using a client communication component 540. The client communication component 540 may provide a client front-end to the bot server 525, which may be mediated by the transmission of messages by a messaging system. The user message exchange 530 may comprise the sending of user-composed messages form the user client 520 to the bot server 525 and the sending of bot messages from the bot server 525 to the user client 520.

A bot application 190 may comprise a software program, such as may execute on a developer computer system or may be hosted by the user request communication system 100. The bot application 190 may engage in a bot information exchange 590 with the bot server 525 via a bot application interface component 580. The bot application interface component 580 may act as a front-end to the bot server 525 and/or messaging system for bot applications. The bot information exchange 590 may comprise the submission of example conversations to the bot server 525 and the performance of bot API calls by the bot application interface component 580 with the bot application 190.

An interaction processing component 560 may interface with a natural-language machine learning (NLML) component 550 to generate a sequence model 510. An interaction processing component 560 may use the sequence model 510 to generate bot responses, including bot messages and bot actions. The interaction processing component 560 may act as an intermediary between the client communication component 540 and the bot application interface component 580. The NLML component 550 may be implemented using known natural language processing (NLP) and machine learning (ML) techniques.

The interaction processing component 580 may receive an example-interaction repository 570, the example-interaction repository 570 comprising a plurality of example user-to-bot interactions. The interaction processing component 580 may access the example-interaction repository 570 from a bot application via the bot application interface component 580 as part of a bot information exchange 590. The interaction processing component 580 may submit the example-interaction repository 570 to a natural-language machine learning component 550 and receive a sequence model 510 from the natural-language machine learning component 550 in response to submitting the example-interaction repository 570. The bot server 525, including the client communication component 540, interaction processing component 560, and bot application interface component 580 may perform a user-to-bot conversation based on the sequence model 510.

The plurality of example user-to-bot interactions of an example-interaction repository 570 may comprise one or more branching example user-to-bot interactions. A branching example user-to-bot interaction is an example user-to-bot interaction with a branch in it, in which the example user-to-bot interaction describes multiple paths that may be taken through the interaction depending on one or more user messages received from the user.

These branching example user-to-bot interactions may be transformed to linearized example user-to-bot interactions. The natural-language machine learning component 550 may be operative to operate on linear, non-branching example user-to-bot interactions. While the branching example user-to-bot interactions may be more convenient for a developer to create and administer, linear example user-to-bot interactions may be more practical for the natural-language machine learning component 550 to build a sequence model 510 from.

The interaction processing component 580 generates a plurality of linearized example user-to-bot interactions. Each of the one or more branching example user-to-bot interactions is traversed multiple times to produce multiple linearized example user-to-bot interactions of the plurality of linearized example user-to-bot interactions. A branching example user-to-bot interaction comprises one or more branches. Traversing the branching example user-to-bot interaction may comprise randomly selecting an outcome of each of the one or more branches. This process of traversing a branching example user-to-bot interaction by randomly selecting an outcome is performed a plurality of times, in some embodiments thousands of times. A specific traversal of a branching example user-to-bot interaction is a linearized example user-to-bot interaction, with each branch effectively removed and replaced with the linear path that was randomly selected. Any known randomization technique may be used, such as pseudo-random number generation.

The interaction processing component 580 generates a linearized example-interaction repository 575 by replacing the one or more branching example user-to-bot interactions with the plurality of linearized example user-to-bot interactions. Each of the one or more branching example user-to-bot interactions has a set of multiple linearized example user-to-bot interactions generated from it by the interaction processing component 580. The interaction processing component 580 generates the linearized example-interaction repository 575 by not including (such as by either removed or refraining from copying) any branching example user-to-bot interaction from the example-interaction repository 570 and including or adding the set of multiple linearized example user-to-bot interactions generated from each of the one or more branching example user-to-bot interactions. This linearized example-interaction repository 575 is then submitted to the natural-language machine learning component 550 to build a sequence model 510 using the same techniques as for generating a sequence model 510 from example user-to-bot interactions that were not based on branching interactions. It will be appreciated that other, such as non-random, traversal techniques may be used, such as a breadth-first traversal.

A branching example user-to-bot interaction may comprise a multiway branching instruction between two or more paths forward through the branching example user-to-bot interaction. A multiway branching instruction empowers selection of a which portion of the branching example user-to-bot interaction is performed. A branching example user-to-bot interaction may comprise a branching jump instruction from a later part of the branching example user-to-bot interaction to an earlier part of the branching example user-to-bot interaction. Such a branching jump instruction empowers conditional repetition of a portion of the branching example user-to-bot interaction. This repeated portion of the branching example user-to-bot interaction may comprise a user-request information-gathering portion, wherein the conditional repetition of the user-request information-gathering portion empowers iterative gathering of user-request information.

Either or both of multiway branching instructions between two or more paths forward and branching jump instructions from a later part of the branching example user-to-bot interaction to an earlier part of the branching example user-to-bot interaction may be used. It will be appreciated that both may be implemented using branch options, with a branch between paths forward through the interaction, wherein one of those paths contains a jump, comprising a branching jump instruction.

Jumps may be also be used to move between example user-to-bot interactions. A bookmark marks a position in an example user-to-bot interaction. A jump instruction in an example user-to-bot interaction specifies a bookmark to which the flow of the example user-to-bot interaction continues. In some cases, the jump may move within a single example user-to-bot interaction. But in other cases, the jump may move from one example user-to-bot interaction to another example user-to-bot interaction. To empower this, the bookmarks may use a namespace that is unified across a particular messaging bot.

Where loops are possible in a branching example user-to-bot interaction, such as a loop for repeatedly gathering information about a user request, the length of a linearized example user-to-bot interaction may grow to an arbitrary length during its random transversal if the selection of the random branch option repeatedly selects a branch option that performs a loop, such as by repeatedly randomly selecting a branch option that leads to a jump to a bookmarked earlier portion of an example user-to-bot interaction that allows for the possibility of again reaching the branch option that leads to the jump.

As such, the interaction processing component 580 traverses a branching example user-to-bot interaction by randomly selecting an outcome of each of a plurality of branches for the branching example user-to-bot interaction to generate a linearized example user-to-bot interaction based on the branching example user-to-bot interaction. However, the interaction processing component 580 may detect that the linearized example user-to-bot interaction being generated by the traversal has exceeded a predefined stopping length. This predefined stopping length may be defined according to any technique, such as character length, line length, number of messages, etc. The interaction processing component 580 stops the traversing of the branching example user-to-bot interaction in response to detecting that the linearized example user-to-bot interaction being generated by the traversal has exceeded a predefined stopping length. The interaction processing component 580 adds the linearized example user-to-bot interaction, at that point at which it is stopped, to the plurality of linearized example user-to-bot interactions.

A user-to-bot conversation (i.e., story) may be delineated according to a messaging session. In some embodiments, the bot application 190 may be responsible for detecting a messaging session break and informing the bot server 525 that a messaging session break has occurred as part of the bot information exchange 590. In some embodiments, the interaction processing component 560 may detect a messaging session break using conversation-break techniques, which may depend on semantic analysis of the conversation and/or on the length of gaps of time in the conversation.

Performing a user-to-bot conversation based on the sequence model 110 may comprise applying the sequence model 110 to a user-request context, a user-to-bot conversation history, and semantic analysis information for one or more user messages. A user-request context may be stored according to a developer-defined structured data object, wherein the developer-defined structured data object comprises a plurality of fields. These fields may be iteratively determined over the length of a user-to-bot conversation based on the semantic analysis information extracted from the user messages in the user-to-bot conversation. A user-to-bot conversation history may comprise the complete exchange of user messages and bot messages, as well as bot actions, for a user-to-bot conversation. The sequence model 510 may incorporate the user-to-bot conversation history in order, among other possible uses, to avoid duplicating messages and actions. Semantic analysis information may comprise the extraction of intent and other semantic information from a user message by a NLML component 550.

One or more of the plurality of example user-to-bot interactions in an example-interaction repository 570 may include one or more quick-reply prompts to a bot message. Each of the one or more quick-reply prompts is a suggested user response to the bot message. One or more of the plurality of example user-to-bot interactions may include two or more quick-reply prompts to the bot message, to provide more than one option to the user. One or more of the one or more quick-reply prompts includes a dynamic variable. A dynamic variable in a quick-reply prompt is assigned by the messaging bot. A dynamic variable may be specified to be filled a particular field of the user-request context. A dynamic variable may be specified to be filled with any information available to the messaging bot, such as social-networking information made available to the messaging bot by a social-networking system. For example, the social-networking system may provide a name for a user, and the messaging bot may provide a quick reply to a question of whose name a reservation should be made in by prompting the user to use their own name for the reservation, while also being able to respond to a user entering a different name, such as via text entry controls for a messaging client.

One or more of the one or more quick-reply prompts may associated with one or more branches for a branching example user-to-bot interaction. The text, or other content, suggested in a quick-reply prompt may match the text, or other content, that a branching example user-to-bot interaction is configured to recognize and branch on. This may improve the performance of the messaging bot by encouraging users to use terms that the sequence model 510 for the messaging bot is specifically trained on. A user may, however, still respond with their own reply that is distinct from the quick-reply prompts, with the sequence model 510 generated by the natural-language machine learning component 550 accommodating these custom user replies.

A quick-reply prompt may comprise a media item. A messaging bot may suggest a sticker, emoji, image, animated image, or any other media item to a user via a quick-reply prompt.

One or more of the one or more quick-reply prompts may be generated from production-performed user-to-bot conversations. For instance, the interaction processing component 560 may log production-performed user-to-bot conversations. These logged production-performed user-to-bot conversations may include a plurality of user messages. For a particular bot message, that logged production-performed user-to-bot conversations may include a plurality of responding user messages. These responding user messages may be analyzed by the interaction processing component 560. Where the interaction processing component 560 detects that a particular user message is a popular response, it may automatically assign that particular user message as a quick-reply prompt for that particular bot message. Alternatively, in order to avoid the assigning of quick-reply prompts that a developer doesn't approve of, the interaction processing component 560 may suggest that particular user message as a quick-reply prompt to a developer via a developer console. The developer may then approve or disapprove the suggested quick-reply prompt.

In some embodiments, statistical analysis of conversations may include the statistical analysis of user-to-user conversations. For a particular user, a statistical analysis may be performed to determine a common user response by that user to a particular message or type of message from other users generally or in response to a particular message or type of message from another user in particular. Where such a common user response is detected, a quick-reply prompt may be provided to the user when that situation in which the common user response was detected is again detected. As such, a user may find it easier to produce common responses without having to re-enter them, with those common responses suggested by the messaging system. The analysis to determine common user responses may operate according to the techniques of the natural-language machine learning component 550. These quick-reply prompts for user-to-user conversations may include media, such as where a user commonly responds to a particular message (which may itself include media) with a piece of media, like a sticker or emoji. In some embodiments, general quick-reply prompt analysis may be performed across all user conversations or a subset of user conversations. For instance, it may be determined that particular replies to a particular user message or type of user message are generally made or are generally made within a particular demographic. These replies may then be suggested as quick-reply prompts to users despite those users having not used the suggested responses themselves.

Performing a user-to-bot conversation may comprise receiving a user message from a client device and generating a bot response based on the user message and the sequence model 510. A bot response may comprise a bot response message, with the client communication component 540 transmitting the bot response message to the client device. Alternatively, a bot response may comprise a bot action. In some embodiments, the bot server 525 may perform the bot action for a hosted messaging bot. In other embodiments, the bot application interface component 580 may transmit the bot action to a bot application 190. Transmitting the bot action to a bot application 190 may comprise performing a bot API call.

A bot action may be executed by the bot application 190 on a developer server to free developers in the development of the execution of bot actions. Any action the developer is able to implement and execute on their system may be provided to a user as a service via the messaging bot. This may remove any restriction from the developer in what platform they execute on, what platform they develop with, the scope of execution of the bot (e.g., the resources available to the bot for execution), the programming language used, what APIs the bot may call, etc.

Generating the bot response based on a user message and a sequence model 110 may comprise generating semantic analysis information for the user message and generating the bot response based on applying the sequence model 510 to the semantic analysis information. The semantic analysis information may be an extraction of intent from the user message using NLP techniques.

The user-request context may be updated according to the conversation by the messaging bot with the user. The interaction processing component 560 may generate an updated user-request context based on processing the user message with the sequence model in association with a current user-request context. In some embodiments, the updating of the user-request context may be performed by the bot application 190. The interaction processing component 560 may generate a user-request context update based on processing the user message with the sequence model 110 in association with a current user-request context. The bot application interface component 580 may transmit the user-request context update to a bot application 190 and receive an updated user-request context from the bot application 190 in response. The interaction processing component 560 may store the updated user-request context for use in processing future user messages.

As with the execution of bot actions on a developer system, the updating of the context on the developer system may free the developer in how contexts are updated based on bot actions. Further, by combining the performance of an action and an update to the context, the machine learning may be made more practical by encapsulating a portion of logic into a unit that the NLML component 550 can learn to operate with as a single action, rather than having to piece together multiple sub-actions that might occur as part of a single bot action: one or more API calls, one or more calculations, one or more changes to the context, etc. This may make it more practical for the NLML component 550 to learn a functional model in the absence of the hundreds of stories that might be used to train a bot to learn to connect together the separate steps that can be encapsulated in a single bot action.

The generation of a bot response may involve processing the current state of the user-to-bot conversation using a sequence model 510 to generate a collection of possible bot responses. The sequence model 510 may comprise a representation of the plurality of example user-to-bot interactions. The processing of the current state of the user-to-bot conversation using the sequence model 510 may result in the selection of a plurality of bot responses from the plurality of example user-to-bot interactions that the sequence model 510 indicates best correspond to next steps matching the current state.

However, in some cases, some of these selected bot responses may be inappropriate. As such, generating the bot response may comprise: receiving a plurality of suggested bot responses, each of the plurality of suggested bot responses associated with a response ranking score; excluding one or more invalid bot responses of the plurality of suggested bot response to generate a plurality of post-processed suggested bot responses; and selecting the bot response as a suggested bot response of the post-processed suggested bot responses with a highest response ranking score.

In some cases, the one or more invalid bot response may be excluded based on lacking complete context for a suggested bot action. Each bot action supported by a bot application 190 may use information stored in fields of a structured data object storing the user-request context. The registration of a messaging bot with the user request communication system 100 may include a specification of the supported bot actions. A specification of a supported bot action may include the API call used by the bot application interface component 580 to instantiate the bot action with the bot application 190 and the fields of the structured data object used in performing the bot action that must therefore be specified before making the API call. The sequence model 510 may not incorporate these restrictions, and therefore suggested bot responses corresponding to bot actions may be excluded in a post-processing step by the interaction processing component 560 based on a determination by the interaction processing component 560 that not all of the specified fields of the structured data object have had values entered for them.

In some embodiments, the user request communication system 100 may include a coherence model modeling the semantic structure of coherent conversations. This coherence model may be generated based on a coherent chat conversation repository comprising a plurality of coherent chat conversations. These coherent chat conversations may be selected by a human operator of the user request communication system 100. The coherence model may be constructed to model the coherent flow of human conversations that corresponds to the give-and-take of discussion that human beings find natural. For instance, the coherence model may avoid having a conversation move to a subsequent topic without the resolution of a current topic. The coherence model may guide the a user-to-bot conversation to resolving service performance information (e.g., pickup/delivery address, contact phone number, etc.) from service request information (e.g., the requested service, requested service options). For example, a messaging bot for ordering a pizza may be guided to resolving the configuration of the pizza in a consecutive series of questions either before or after resolving the configuration of how and where the pizza should be delivered.

The coherence model may be used by the interaction processing component 560 to generate a coherence score for each of the plurality of suggested bot responses. The coherence score may be a rating between 0 and 1 of how coherent each of the plurality of suggested bot responses is with the existing history of the user-to-bot conversation. The coherence score may be a rating between 0 and 1 of how coherent the user-to-bot conversation would be with the addition of each of the plurality of suggested bot responses. The response ranking score for each of the plurality of suggested bot responses may therefore be determined based on the coherence score for each of the plurality of suggested bot responses, with the suggested bot response with the highest response ranking score being selected for use.

Performing a user-to-bot conversation may include an iterative updating of a user-request context based on the sequence model 510. The user-request context may be iteratively updated to determine the intent and preferences of a user in engaging with a messaging bot, with bot actions depending on the availability of certain information in the user-request context for their performance. The user-to-bot conversation may be an attempt to collect this information from a user through the sending of bot messages and the receiving of user messages. As such, performing the user-to-bot conversation may comprise exchanging a series of user messages and bot messages via a messaging system to generate the user-request context.

Performing the user-to-bot conversation may comprise exchanging a series of user messages and bot messages via a messaging system to generate an inferred user-request action. This inferred user-request action may comprise one or more bot actions generated based on the sequence model 510. The bot application interface component 580 may then perform the inferred user-request action based on the user-request context. The inferred user-request action may be defined based on an API call, wherein one or more parameters of the API call are defined based on the user-request context.

For the example-interaction repository 570, one or more of the example user-to-bot interactions may comprise developer-written user-to-bot hypothetical interactions. These developer-written user-to-bot hypothetical interactions may be generated by a developer to describe the preferred behavior of the messaging bot. The bot application interface component 580 may receive the one or more developer-written user-to-bot interactions via a developer console.

For the example-interaction repository 570, one or more of the example user-to-bot interactions may comprise usage-based user-to-bot interactions. These usage-based user-to-bot interactions may be developed from the performance of the messaging bot with users, rather than being scripted by a developer. However, a developer may edit the conversations of a messaging bot with users prior to them being deployed as examples.

The bot application interface component 580 may receive one or more production user-to-bot interactions generated from production-performed user-to-bot conversations. A developer console may display the one or more production user-to-bot interactions and receive developer validation of the one or more production user-to-bot interactions to generate the usage-based user-to-bot interactions. The interaction processing component 560 may include the one or more usage-based user-to-bot interactions in the example-interaction repository 570 in response to receiving the developer validation of the one or more usage-based user-to-bot interactions.

In some cases, the developer may edit a production user-to-bot interaction before validating it as a usage-based user-to-bot interaction for inclusion in the example-interaction repository 570. The developer console may receive one or more developer modifications for the one or more production user-to-bot interactions to generate the usage-based user-to-bot interactions. As such, the version of a user-to-bot interaction included in the example-interaction repository 570 may include developer modifications. In some cases, these developer modifications may be performed to sanitize a recorded user-to-bot interaction of personal information. Personal information may be excluded to protect the privacy of users. Request-specific information may be retained, but annotated to indicate the portions of the user-to-bot interaction from which user-request context is determined.

In some embodiments, the NLML component 550 may depend on annotations of example user-to-bot interactions to determine the information that should be extracted from user messages for addition to the user-request context. A developer console may receive one or more developer annotations of the one or more production user-to-bot interactions to generate the usage-based user-to-bot interactions. The interaction processing component 560 may include the one or more developer annotations with the one or more usage-based user-to-bot interactions in the example-interaction repository 570. The one or more developer annotations may comprise a context update annotation.

In some embodiments, the extraction of semantic information may be directed to the determination of values for the fields of the structured data object. As such, the extraction of semantic information may be supervised information extraction, the supervision being based on constraining the natural language processing to just the determination of the values for these fields. Because of this, distinguishing between the different bot responses represented in the example-interaction repository 570 and therefore in the sequence model 510 may only be performed based on the fields of the structured data object.

However, in other embodiments, unsupervised information extraction of unstructured semantic information may be employed. The interaction processing component 560 performing the user-to-bot conversation based on the sequence model 510 may comprise incorporating extracted unsupervised information into one or more suggested bot responses. The NLML component 550 and the interaction processing component 560 may extract unsupervised information and use the unsupervised information to distinguish between different bot responses that might not be distinguished between based on just the supervised information extraction of structured semantic information. Either the selection of the suggested bot responses or the ranking of the suggested bot responses may used this unsupervised information. The unstructured semantic information may comprise an additional input to the sequence model 110 for performing a user-to-bot conversation. As such, performing a user-to-bot conversation based on the sequence model 110 may comprise applying the sequence model 110 to a user-request context, a user-to-bot conversation history, semantic analysis information for one or more user messages, and unsupervised information extracted from a most-recent user message.

For example, a polite opening remark by a user may be matched to a polite opening response by a messaging bot by the unstructured extraction of a politeness intent from the user's opening remark to an unstructured detection of a politeness connotation in an example bot response message. In general, bot responses may be analyzed to determine unsupervised semantic information for the bot responses. User messages may be analyzed to determine unsupervised semantic information for the user messages. The unsupervised semantic information may be compared and used to select and/or rank the bot responses. Various ranking criteria may be combined, such as through the mathematical combination of various ranking scores or ranking weights.

Cross-messenger bot learning may also be employed. Some portions of a user-to-bot conversation may be independent of a specific service provided by a messaging bot. For example, friendly banter at the beginning or conclusion of a conversation may be general across a plurality of bots. In some embodiments, a sequence model 510 for one messaging bot may incorporate service-independent bot responses generated based on example conversations for other messaging bots. Alternatively or additionally, in some embodiments, cross-messenger bot learning may be employed with regard to similar services, with service-specific bot responses generated based on example conversations for one messaging bot included when generating a sequence model 510 for another messaging bot.

In some embodiments, example conversations for a plurality of messaging bots, for either a same service or different services, may be joined together to generate a sequence model 510. Where example conversations for multiple messaging bots providing the same or similar services are joined together, the resulting sequence model 510 may be deployed to improve the quality of the user request communication system 100 for that service beyond what a single set of examples conversations for one messaging bot would provide. Where example conversations for multiple messaging bots providing different services are joined together, the resulting sequence model 510 may be deployed to improve the flexibility of the user request communication system 100 in responding to different types of service requests in a single messaging conversation. Where example conversations for a plurality of messaging bots are joined together, the bot actions may still be specific to a particular messaging bot and therefore bot application, with the bot application corresponding to a particular bot API call for a selected bot action being used.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive an example-interaction repository, the example-interaction repository comprising a plurality of example user-to-bot interactions, the plurality of example user-to-bot interactions comprising one or more branching example user-to-bot interactions at block 602.

The logic flow 600 may generate a plurality of linearized example user-to-bot interactions, wherein each of the one or more branching example user-to-bot interactions is traversed multiple times to produce multiple linearized example user-to-bot interactions of the plurality of linearized example user-to-bot interactions at block 604.

The logic flow 600 may generate a linearized example-interaction repository by replacing the one or more branching example user-to-bot interactions with the plurality of linearized example user-to-bot interactions at block 606.

The logic flow 600 may submit the linearized example-interaction repository to a natural-language machine learning component at block 608.

The logic flow 600 may receive a sequence model from the natural-language machine learning component in response to submitting the linearized example-interaction repository at block 610.

The logic flow 600 may perform a user-to-bot conversation based on the sequence model at block 612.

The embodiments are not limited to this example.

Figure 7:
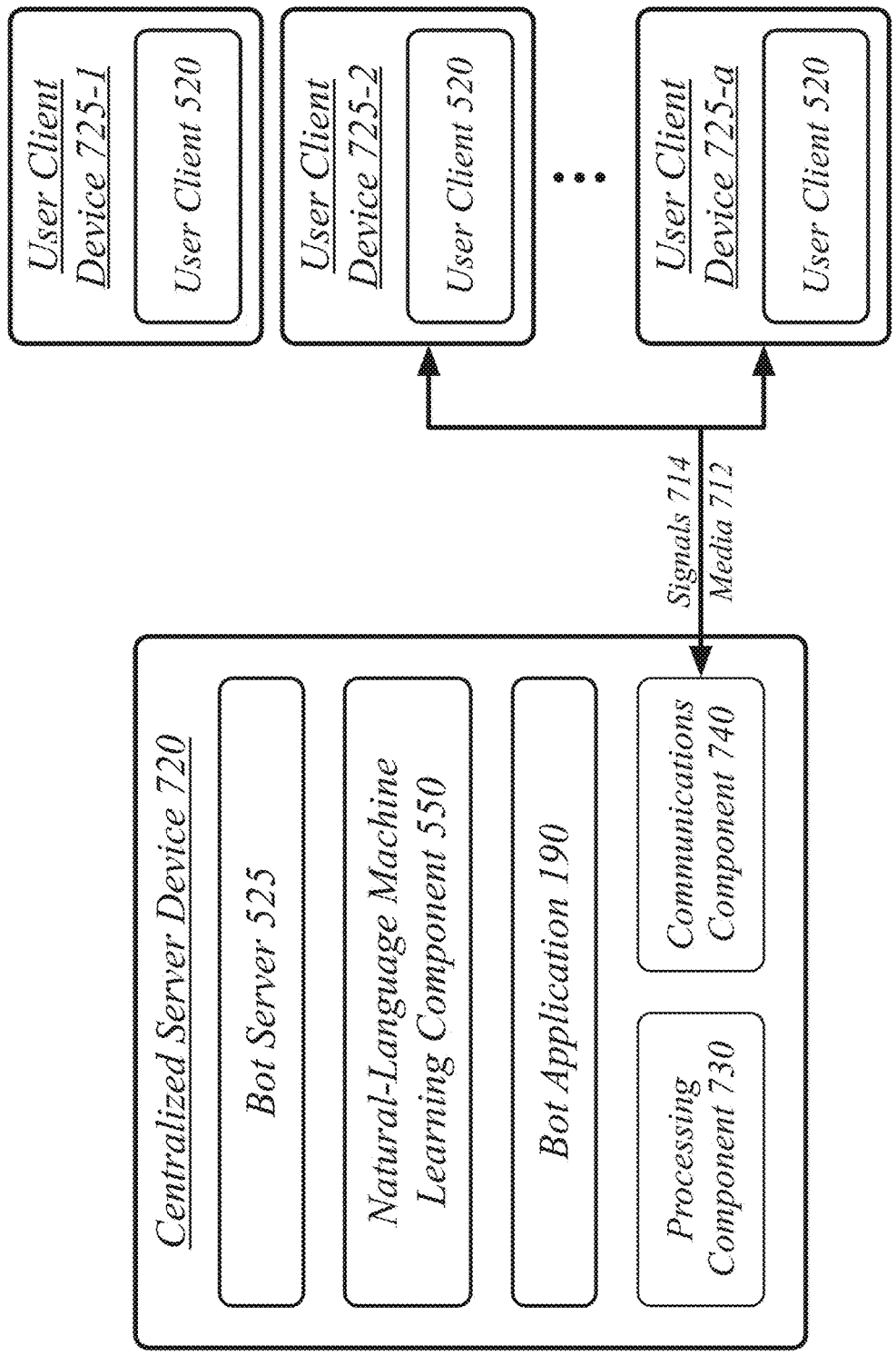
FIG. 7 illustrates an embodiment of a centralized system for the system of FIG. 1.

FIG. 7 illustrates a block diagram of a centralized system 700. The centralized system 700 may implement some or all of the structure and/or operations for the user request communication system 100 in a single computing entity, such as entirely within a single centralized server device 720.

The centralized server device 720 may comprise any electronic device capable of receiving, processing, and sending information for the user request communication system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the user request communication system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the user request communication system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The devices may be internal or external to the centralized server device 720 as desired for a given implementation. The centralized server device 720 may implement the bot server 525, natural-language machine learning component 550, and bot application 190. This may comprise an embodiment in which the bot application 190 is executed by a messaging system. In some embodiments, a centralized server device 720 may be used with a bot application 190 executed by the bot provider. The centralized server device 720 may communicate with a plurality of user client devices 725, each executing a user client 520.

Figure 8:
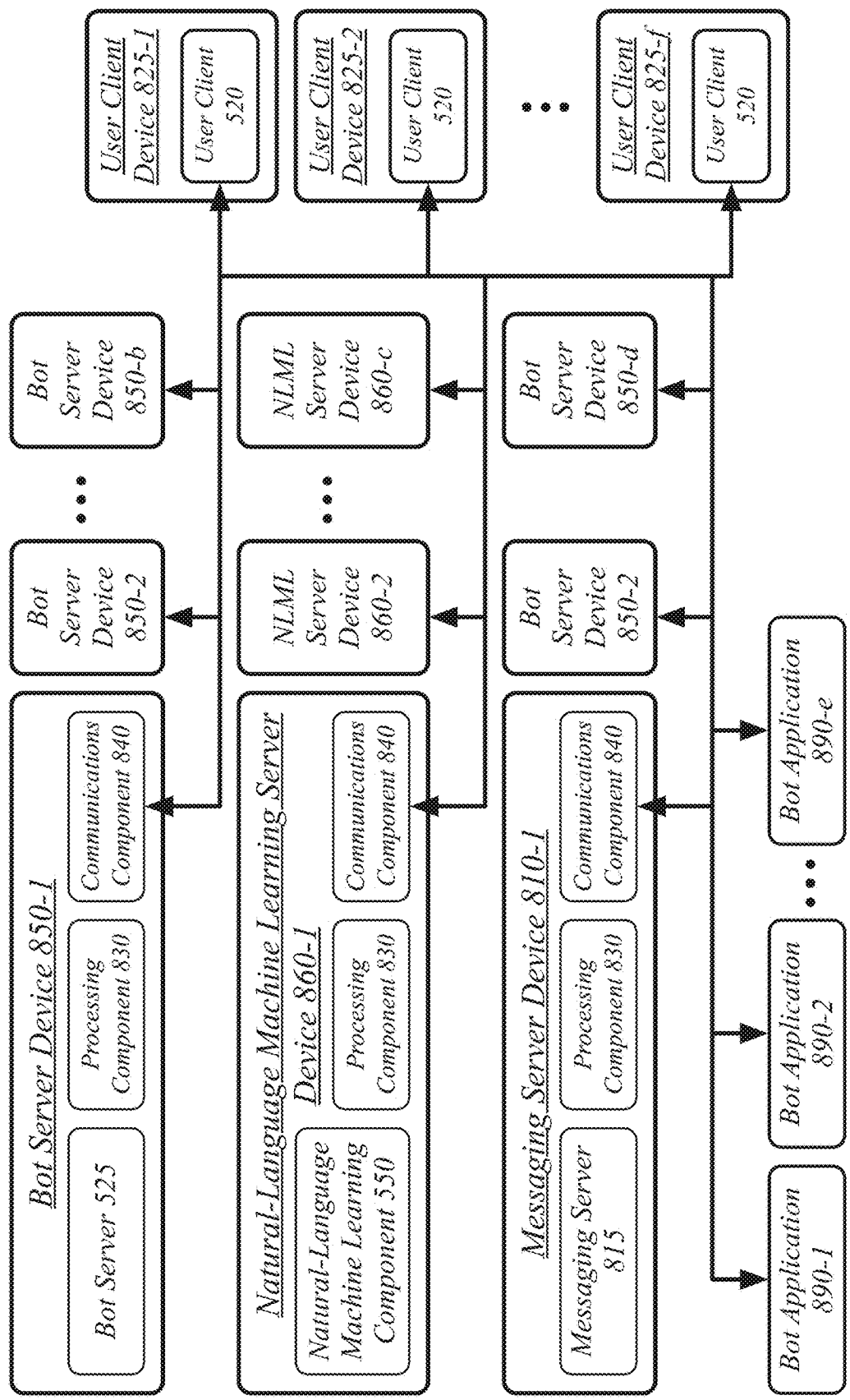
FIG. 8 illustrates an embodiment of a distributed system for the system of FIG. 1.

FIG. 8 illustrates a block diagram of a distributed system 800. The distributed system 800 may distribute portions of the structure and/or operations for the user request communication system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of messaging server devices 810, bot server devices 850, and natural-language machine learning server devices 860. In general, the server devices 810, 850, and 860, and 860 may be the same or similar to the centralized server device 820 as described with reference to FIG. 8. For instance, the server devices 810, 850, and 860 may each comprise a processing component 830 and a communications component 840 which are the same or similar to the processing component 830 and the communications component 840, respectively, as described with reference to FIG. 8. In another example, the server devices 810, 850, and 860 may communicate over a communications media 812 using communications signals 814 via the communications components 840.

The messaging server devices 810 may comprise or employ one or more programs that operate to perform various methodologies in accordance with the described embodiments. In one embodiment, for example, the messaging server devices 810 may implement a plurality of bot servers 525.

The bot server devices 850 may comprise or employ one or more programs that operate to perform various methodologies in accordance with the described embodiments. In one embodiment, for example, the bot server devices 850 may implement a plurality of natural-language machine learning components 550.

The natural-language machine learning (NLML) server devices 850 may comprise or employ one or more programs that operate to perform various methodologies in accordance with the described embodiments. In one embodiment, for example, the natural-language machine learning server devices 850 may implement a plurality of messaging servers 815.

The server devices 810, 850, and 860 may communicate with a plurality of bot applications 890. Each of the plurality of bot applications 890 may provide different automated services, though there may also be duplication of automated services such as may provide for competition. The server devices 810, 850, and 860 may communicate with a plurality of user client devices 825, each executing a user client 520.

Figure 9:
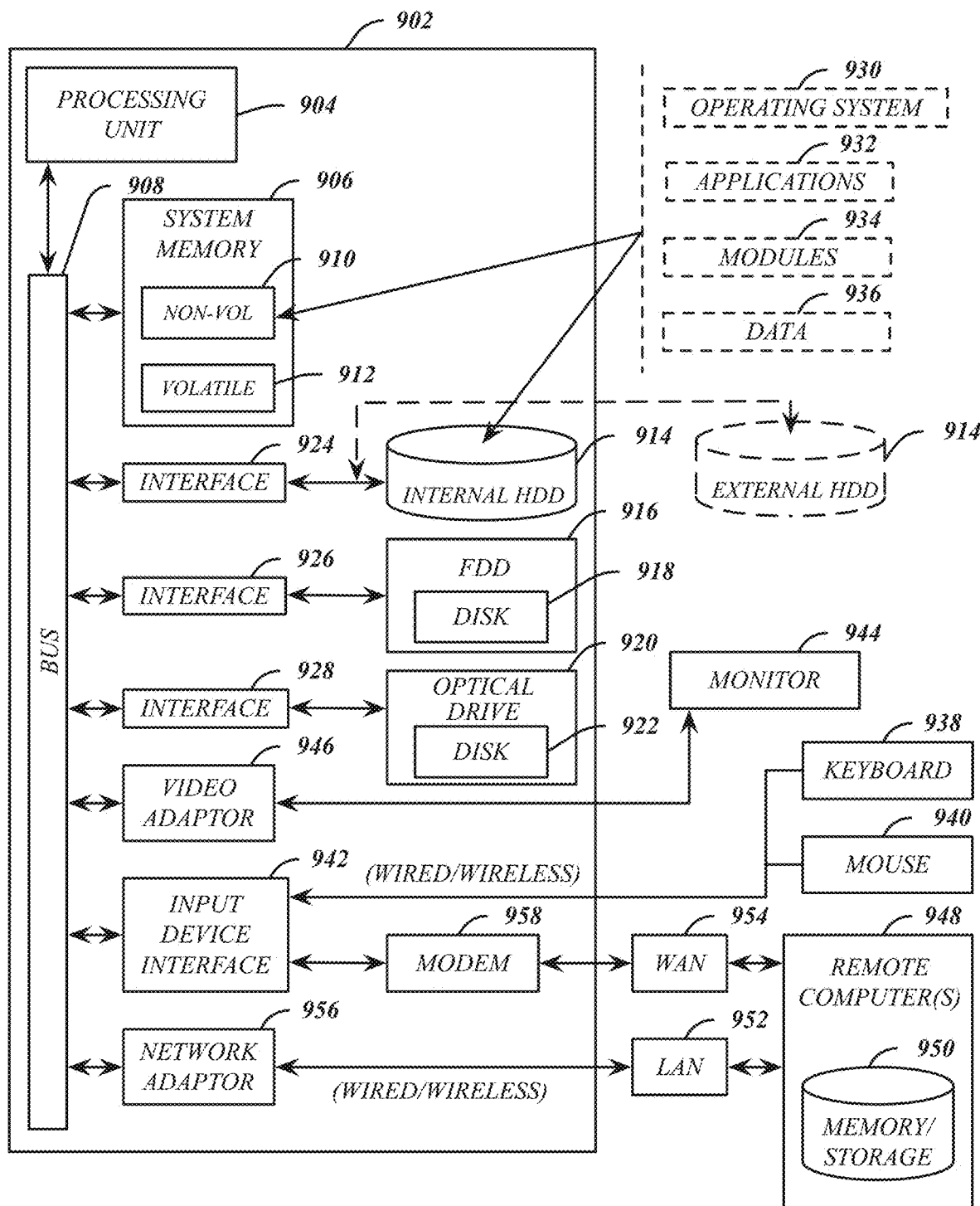
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the user request communication system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
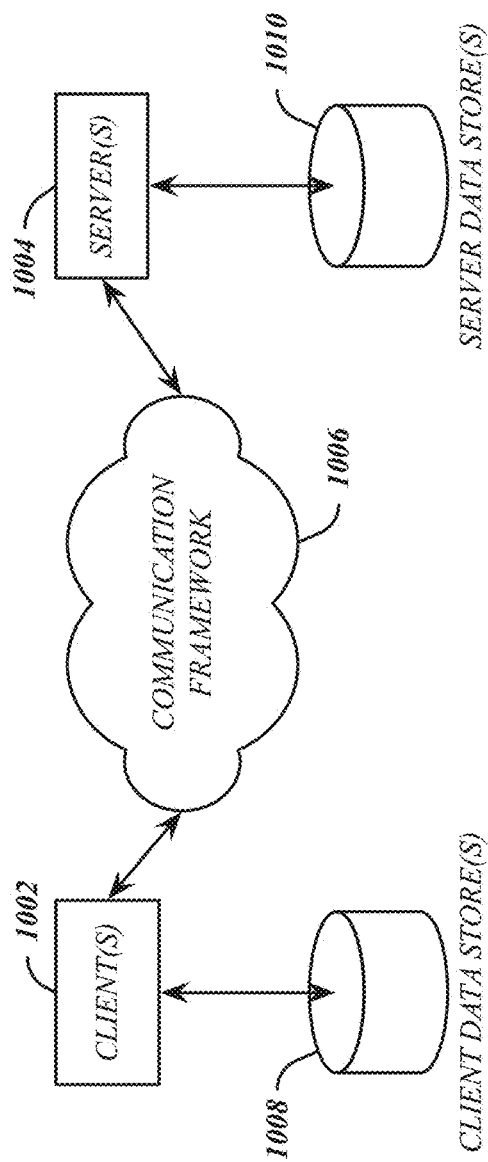
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement one or more user client 520 and/or one or more bot application 190. The servers 1004 may implement one or more bot server 525, one or more natural-language machine learning component 550, and/or one or more messaging server 815. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
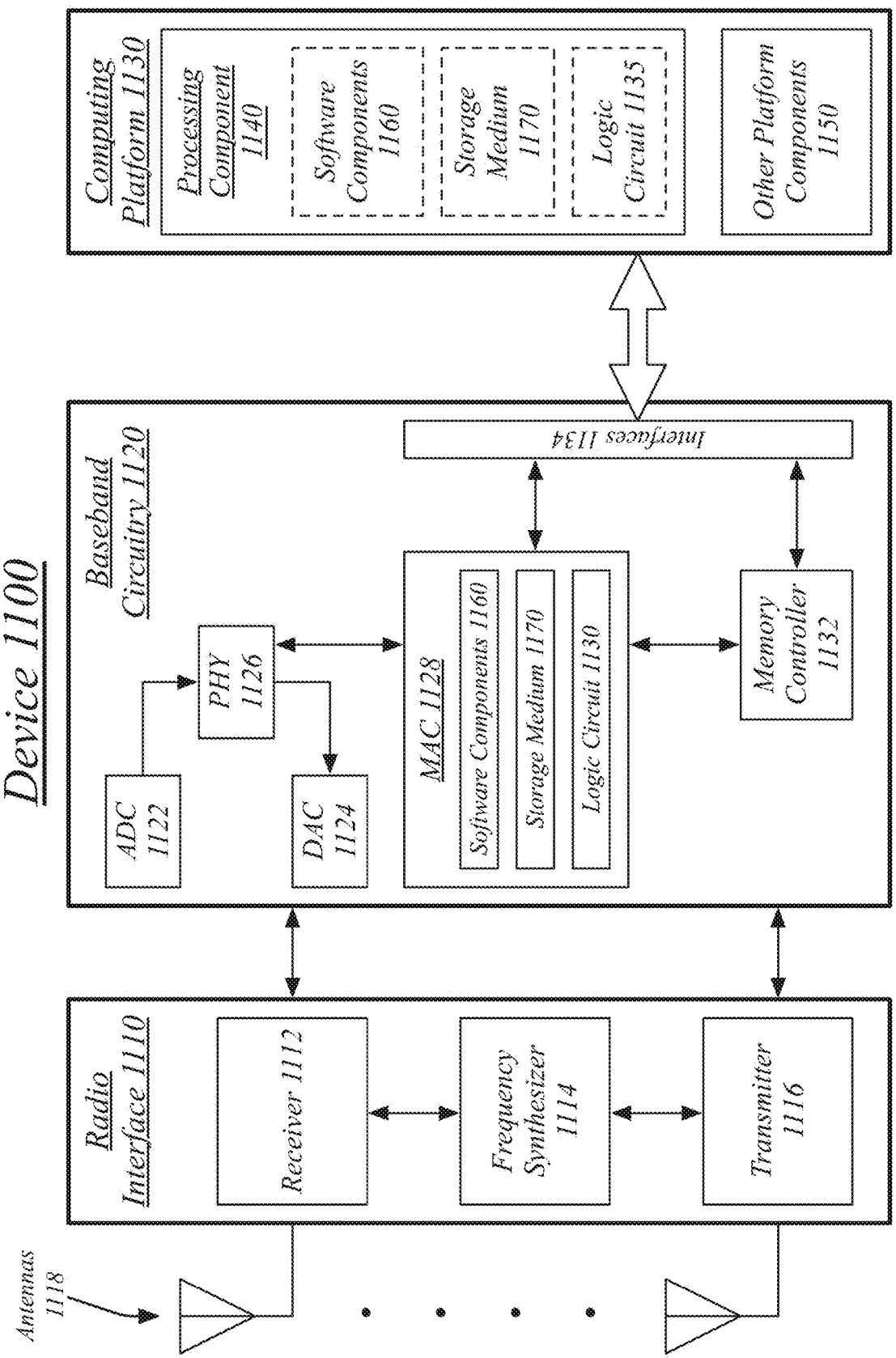
FIG. 11 illustrates an embodiment of a radio device architecture.

FIG. 11 illustrates an embodiment of a device 1100 for use in a multicarrier OFDM system, such as the user request communication system 100. Device 1100 may implement, for example, software components 1160 as described with reference to user request communication system 100 and/or a logic circuit 1135. The logic circuit 1135 may include physical circuits to perform operations described for the user request communication system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the user request communication system 100 and/or logic circuit 1135 in a single computing entity, such as entirely within a single device. Alternatively, the device 1100 may distribute portions of the structure and/or operations for the user request communication system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the user request communication system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an example-interaction repository, the example-interaction repository comprising a plurality of example user-to-bot interactions; submitting the example-interaction repository to a natural-language machine learning component; receiving a sequence model from the natural-language machine learning component in response to submitting the example-interaction repository; and performing a user-to-bot conversation based on the sequence model.

A computer-implemented method may further comprise wherein the user-to-bot conversation is delineated according to a messaging session, further comprising: detecting a messaging session break.

A computer-implemented method may further comprise wherein performing the user-to-bot conversation based on the sequence model comprises applying the sequence model to a user-request context, a user-to-bot conversation history, and semantic analysis information for one or more user messages.

A computer-implemented method may further comprise performing the user-to-bot conversation comprising: receiving a user message from a client device; and generating a bot response based on the user message and the sequence model.

A computer-implemented method may further comprise the bot response comprising a bot response message, further comprising: transmitting the bot response message to the client device.

A computer-implemented method may further comprise the bot response comprising a bot action, further comprising: performing the bot action.

A computer-implemented method may further comprise the bot response comprising a bot action, further comprising: transmitting the bot action to a bot application, the bot action transmitted to the bot application in association with a user-request context; and receiving an updated user-request context from the bot application.

A computer-implemented method may further comprise generating the bot response based on the user message and the sequence model comprising: generating semantic analysis information for the user message; and generating the bot response based on applying the sequence model to the semantic analysis information.

A computer-implemented method may further comprise generating an updated user-request context based on processing the user message with the sequence model in association with a current user-request context.

A computer-implemented method may further comprise generating a user-request context update based on processing the user message with the sequence model in association with a current user-request context; transmitting the user-request context update to a bot application; and receiving an updated user-request context from the bot application.

A computer-implemented method may further comprise generating the bot response comprising: receiving a plurality of suggested bot responses, each of the plurality of suggested bot responses associated with a response ranking score; excluding one or more invalid bot responses of the plurality of suggested bot response to generate a plurality of post-processed suggested bot responses; and selecting the bot response as a suggested bot response of the post-processed suggested bot responses with a highest response ranking score.

A computer-implemented method may further comprise the one or more invalid bot response excluded based on lacking complete context for a suggested bot action.

A computer-implemented method may further comprise the response ranking score for each of the plurality of suggested bot responses determined based on a coherence score for each of the plurality of suggested bot responses.

A computer-implemented method may further comprise the coherence score for each of the plurality of suggested bot responses determined based on a coherence model, further comprising: generating the coherence model based on a coherent chat conversation repository.

A computer-implemented method may further comprise wherein performing the user-to-bot conversation includes an iterative updating of a user-request context based on the sequence model.

A computer-implemented method may further comprise the user-request context stored according to a developer-defined structured data object.

A computer-implemented method may further comprise wherein performing the user-to-bot conversation comprises exchanging a series of user messages and bot messages via a messaging system to generate a user-request context.

A computer-implemented method may further comprise wherein performing the user-to-bot conversation comprises exchanging a series of user messages and bot messages via a messaging system to generate an inferred user-request action.

A computer-implemented method may further comprise performing the inferred user-request action based on the user-request context.

A computer-implemented method may further comprise the inferred user-request action defined based on an application program interface call, wherein one or more parameters of the application program interface call are defined based on the user-request context.

A computer-implemented method may further comprise wherein one or more of the example user-to-bot interactions comprise developer-written user-to-bot hypothetical interactions, further comprising: receiving the one or more developer-written user-to-bot interactions via a developer console.

A computer-implemented method may further comprise wherein one or more of the example user-to-bot interactions comprise usage-based user-to-bot interactions.

A computer-implemented method may further comprise receiving one or more production user-to-bot interactions generated from production-performed user-to-bot conversations; displaying the one or more production user-to-bot interactions via a developer console; receiving developer validation of the one or more production user-to-bot interactions via the developer console to generate the usage-based user-to-bot interactions; and including the one or more usage-based user-to-bot interactions in the example-interaction repository in response to receiving the developer validation of the one or more usage-based user-to-bot interactions.

A computer-implemented method may further comprise receiving one or more developer modifications for the one or more production user-to-bot interactions via the developer console to generate the usage-based user-to-bot interactions.

A computer-implemented method may further comprise receiving one or more developer annotations of the one or more production user-to-bot interactions via the developer console to generate the usage-based user-to-bot interactions; and including the one or more developer annotations with the one or more usage-based user-to-bot interactions in the example-interaction repository.

A computer-implemented method may further comprise the one or more developer annotations comprising a context update annotation.

A computer-implemented method may further comprise performing the user-to-bot conversation based on the sequence model comprising: incorporating extracted unsupervised information into one or more suggested bot responses.

An apparatus may comprise a processor circuit; an interaction processing component operative on the processor circuit to submit an example-interaction repository to a natural-language machine learning component, the example-interaction repository comprising a plurality of example user-to-bot interactions, and receive a sequence model from the natural-language machine learning component in response to submitting the example-interaction repository; a client communication component operative to perform a user message exchange with a user client to perform a user-to-bot conversation based on the sequence model; and a bot application interface component operative to receive the example-interaction repository from a bot application and perform a bot information exchange with the bot application to perform the user-to-bot conversation based on the sequence model, wherein performing the user-to-bot conversation based on the sequence model comprises applying the sequence model to a user-request context, a user-to-bot conversation history, semantic analysis information for one or more user messages, and extracted unsupervised information for the one or more user messages. The apparatus may be operative to implement any of the computer-implemented methods described herein.

A computer-implemented method may comprise receiving an example-interaction repository, the example-interaction repository comprising a plurality of example user-to-bot interactions, the plurality of example user-to-bot interactions comprising one or more branching example user-to-bot interactions; generating a plurality of linearized example user-to-bot interactions, wherein each of the one or more branching example user-to-bot interactions is traversed multiple times to produce multiple linearized example user-to-bot interactions of the plurality of linearized example user-to-bot interactions; generating a linearized example-interaction repository by replacing the one or more branching example user-to-bot interactions with the plurality of linearized example user-to-bot interactions; submitting the linearized example-interaction repository to a natural-language machine learning component; receiving a sequence model from the natural-language machine learning component in response to submitting the linearized example-interaction repository; and performing a user-to-bot conversation based on the sequence model.

A computer-implemented method may further comprise a branching example user-to-bot interaction comprising one or more branches, wherein traversing the branching example user-to-bot interaction comprises randomly selecting an outcome of each of the one or more branches.

A computer-implemented method may further comprise traversing a branching example user-to-bot interaction by randomly selecting an outcome of each of a plurality of branches for the branching example user-to-bot interaction to generate a linearized example user-to-bot interaction based on the branching example user-to-bot interaction; detecting that the linearized example user-to-bot interaction has exceeded a predefined stopping length; stopping the traversing of the branching example user-to-bot interaction; and adding the linearized example user-to-bot interaction to the plurality of linearized example user-to-bot interactions.

A computer-implemented method may further comprise wherein a branching example user-to-bot interaction comprises a branching jump instruction from a later part of the branching example user-to-bot interaction to an earlier part of the branching example user-to-bot interaction, the branching jump instruction empowering conditional repetition of a portion of the branching example user-to-bot interaction.

A computer-implemented method may further comprise the portion of the branching example user-to-bot interaction comprising a user-request information-gathering portion, wherein the conditional repetition of the user-request information-gathering portion empowers iterative gathering of user-request information.

A computer-implemented method may further comprise wherein a branching example user-to-bot interaction comprises a multiway branching instruction between two or more paths forward through the branching example user-to-bot interaction, the multiway branching instruction empowering selection of a which portion of the branching example user-to-bot interaction is performed.

A computer-implemented method may further comprise wherein one or more of the plurality of example user-to-bot interactions includes one or more quick-reply prompts to a bot message, wherein each of the one or more quick-reply prompts is a suggested user response to the bot message.

A computer-implemented method may further comprise wherein one or more of the plurality of example user-to-bot interactions includes two or more quick-reply prompts to the bot message.

A computer-implemented method may further comprise wherein one or more of the one or more quick-reply prompts includes a dynamic variable.

A computer-implemented method may further comprise wherein one or more of the one or more quick-reply prompts comprises a media item.

A computer-implemented method may further comprise wherein one or more of the one or more quick-reply prompts is generated from production-performed user-to-bot conversations.

A computer-implemented method may further comprise wherein one or more of the one or more quick-reply prompts is associated with one or more branches for a branching example user-to-bot interaction.

An apparatus may comprise a processor circuit; an interaction processing component operative on the processor circuit to generate a plurality of linearized example user-to-bot interactions, wherein each of one or more branching example user-to-bot interactions is traversed multiple times to produce multiple linearized example user-to-bot interactions of the plurality of linearized example user-to-bot interactions; generate a linearized example-interaction repository by replacing the one or more branching example user-to-bot interactions with the plurality of linearized example user-to-bot interactions; and submit the linearized example-interaction repository to a natural-language machine learning component, and receive a sequence model from the natural-language machine learning component in response to submitting the linearized example-interaction repository; a client communication component operative to perform a user message exchange with a user client to perform a user-to-bot conversation based on the sequence model; and a bot application interface component operative to receive the example-interaction repository from a bot application, the example-interaction repository comprising a plurality of example user-to-bot interactions, the plurality of example user-to-bot interactions comprising the one or more branching example user-to-bot interactions, and perform a bot information exchange with the bot application to perform the user-to-bot conversation based on the sequence model, wherein performing the user-to-bot conversation based on the sequence model comprises applying the sequence model to a user-request context, a user-to-bot conversation history, semantic analysis information for one or more user messages, and extracted unsupervised information for the one or more user messages. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving an example-interaction repository comprising one or more pregenerated branching example user-to-bot interactions;
generating a plurality of linearized example user-to-bot interactions by traversing each of the one or more branching example user-to-bot interactions multiple times, wherein generating the plurality of linearized example user-to-bot interactions comprises:
traversing a branching example user-to-bot interaction by randomly selecting an outcome of each of a plurality of branches for the branching example user-to-bot interaction to generate a linearized example user-to-bot interaction based on the branching example user-to-bot interaction;
detecting that the linearized example user-to-bot interaction has exceeded a predefined stopping length;
stopping the traversing of the branching example user-to-bot interaction; and
adding the linearized example user-to-bot interaction to the plurality of linearized example user-to-bot interactions;
generating a linearized example-interaction repository by replacing the one or more branching example user-to-bot interactions with the linearized example user-to-bot interactions;
submitting the linearized example-interaction repository as training data to the natural-language machine learning component;
receiving a sequence model from the natural-language machine learning component in response to submitting the linearized example-interaction repository; and
performing a user-to-bot conversation based on the sequence model.

2. The method of claim 1, wherein a branching example user-to-bot interaction comprises a branching jump instruction from a later part of the branching example user-to-bot interaction to an earlier part of the branching example user-to-bot interaction, the branching jump instruction empowering conditional repetition of a portion of the branching example user-to-bot interaction.

3. The method of claim 1, wherein a branching example user-to-bot interaction comprises a multiway branching instruction between two or more paths forward through the branching example user-to-bot interaction, the multiway branching instruction empowering selection of a which portion of the branching example user-to-bot interaction is performed.

4. The method of claim 1, wherein one or more of the plurality of example user-to-bot interactions includes one or more quick-reply prompts to a bot message, wherein each of the one or more quick-reply prompts is a suggested user response to the bot message.

5. The method of claim 4, wherein one or more of the one or more quick-reply prompts is generated from production-performed user-to-bot conversations.

6. The method of claim 4, wherein one or more of the one or more quick-reply prompts is associated with one or more branches for a branching example user-to-bot interaction.

7. An apparatus, comprising:
a processor circuit;
an interaction processing component operative on the processor circuit to generate a plurality of linearized example user-to-bot interactions by traversing each of one or more pregenerated branching example user-to-bot interactions, multiple times, wherein generating the plurality of linearized example user-to-bot interactions comprises:
traversing a branching example user-to-bot interaction by randomly selecting an outcome of each of a plurality of branches for the branching example user-to-bot interaction to generate a linearized example user-to-bot interaction based on the branching example user-to-bot interaction;
detecting that the linearized example user-to-bot interaction has exceeded a predefined stopping length;
stopping the traversing of the branching example user-to-bot interaction; and
adding the linearized example user-to-bot interaction to the plurality of linearized example user-to-bot interactions;
generate a linearized example-interaction repository by replacing the one or more branching example user-to-bot interactions with the plurality of linearized example user-to-bot interactions; and
submit the linearized example-interaction repository as training data to the natural-language machine learning component, and receive a sequence model from the natural-language machine learning component in response to submitting the linearized example-interaction repository;
a client communication component operative to perform a user message exchange with a user client to perform a user-to-bot conversation based on the sequence model; and
a bot application interface component operative to receive the example-interaction repository from a bot application and perform a bot information exchange with the bot application to perform the user-to-bot conversation based on the sequence model, wherein performing the user-to-bot conversation based on the sequence model comprises applying the sequence model to a user-request context, a user-to-bot conversation history, semantic analysis information for one or more user messages, and extracted unsupervised information for the one or more user messages.

8. The apparatus of claim 7, wherein a branching example user-to-bot interaction comprises a branching jump instruction from a later part of the branching example user-to-bot interaction to an earlier part of the branching example user-to-bot interaction, the branching jump instruction empowering conditional repetition of a portion of the branching example user-to-bot interaction.

9. The apparatus of claim 7, wherein a branching example user-to-bot interaction comprises a multiway branching instruction between two or more paths forward through the branching example user-to-bot interaction, the multiway branching instruction empowering selection of a which portion of the branching example user-to-bot interaction is performed.

10. The apparatus of claim 7, wherein one or more of the plurality of example user-to-bot interactions includes one or more quick-reply prompts to a bot message, wherein each of the one or more quick-reply prompts is a suggested user response to the bot message.

11. The apparatus of claim 10, wherein one or more of the one or more quick-reply prompts is generated from production-performed user-to-bot conversations.

12. The apparatus of claim 10, wherein one or more of the one or more quick-reply prompts is associated with one or more branches for a branching example user-to-bot interaction.

13. At least one non-transitory computer-readable storage medium comprising instructions that, when executed, cause a system to:
   receive an example-interaction repository comprising one or more pregenerated branching example user-to-bot interactions;
   generate a plurality of linearized example user-to-bot interactions by traversing each of the one or more branching example user-to-bot interactions multiple times, wherein generating the plurality of linearized example user-to-bot interactions comprises:
   traversing a branching example user-to-bot interaction by randomly selecting an outcome of each of a plurality of branches for the branching example user-to-bot interaction to generate a linearized example user-to-bot interaction based on the branching example user-to-bot interaction;
   detecting that the linearized example user-to-bot interaction has exceeded a predefined stopping length;
   stopping the traversing of the branching example user-to-bot interaction; and
   adding the linearized example user-to-bot interaction to the plurality of linearized example user-to-bot interactions;
   generate a linearized example-interaction repository by replacing the one or more branching example user-to-bot interactions with the linearized example user-to-bot interactions;
   submit the linearized example-interaction repository as training data to a natural-language machine learning component;
   receive a sequence model from the natural-language machine learning component in response to submitting the linearized example-interaction repository; and
   perform a user-to-bot conversation based on the sequence model.

14. The computer-readable storage medium of claim 13, wherein a branching example user-to-bot interaction comprises a branching jump instruction from a later part of the branching example user-to-bot interaction to an earlier part of the branching example user-to-bot interaction, the branching jump instruction empowering conditional repetition of a portion of the branching example user-to-bot interaction.

15. The computer-readable storage medium of claim 13, wherein a branching example user-to-bot interaction comprises a multiway branching instruction between two or more paths forward through the branching example user-to-bot interaction, the multiway branching instruction empowering selection of a which portion of the branching example user-to-bot interaction is performed.

16. The computer-readable storage medium of claim 13, wherein one or more of the plurality of example user-to-bot interactions includes one or more quick-reply prompts to a bot message, wherein each of the one or more quick-reply prompts is a suggested user response to the bot message.

17. The computer-readable storage medium of claim 16, wherein one or more of the one or more quick-reply prompts is generated from production-performed user-to-bot conversations.

18. The computer-readable storage medium of claim 16, wherein one or more of the one or more quick-reply prompts is associated with one or more branches for a branching example user-to-bot interaction.

* * * * *